(12) United States Patent
Bendale et al.

(10) Patent No.: US 11,544,886 B2
(45) Date of Patent: Jan. 3, 2023

(54) GENERATING DIGITAL AVATAR

(71) Applicant: Samsung Electronics Company, Ltd., Gyeonggi-do (KR)

(72) Inventors: Abhijit Z Bendale, Campbell, CA (US); Pranav K Mistry, Saratoga, CA (US)

(73) Assignee: Samsung Electronics Co., Ltd.

( * ) Notice: Subject to any disclaimer, the term of this patent is extended or adjusted under 35 U.S.C. 154(b) by 14 days.

(21) Appl. No.: 17/124,381

(22) Filed: Dec. 16, 2020

(65) Prior Publication Data
US 2021/0201549 A1 Jul. 1, 2021

Related U.S. Application Data

(60) Provisional application No. 62/949,256, filed on Dec. 17, 2019.

(51) Int. Cl.
*G06T 13/00* (2011.01)
*G06N 5/04* (2006.01)
(Continued)

(52) U.S. Cl.
CPC .............. *G06T 13/00* (2013.01); *G06N 5/04* (2013.01); *G06N 20/00* (2019.01); *G06V 40/174* (2022.01)

(58) Field of Classification Search
CPC ........... G06T 13/00; G06T 13/40; G06N 5/04; G06N 20/00; G06N 3/0445; G06N 3/006; G06N 3/0427; G06N 3/08; G06N 5/022; G06N 5/041; G06V 40/174; G06F 40/216; G06F 40/30
See application file for complete search history.

(56) References Cited

U.S. PATENT DOCUMENTS 8,705,870 B2   4/2014  Wang
9,336,268 B1*  5/2016  Moudy ............... G06N 3/0445
(Continued)

FOREIGN PATENT DOCUMENTS

KR        101006191 B1    1/2011
KR     2018-0070170 A     6/2018

OTHER PUBLICATIONS

Tian Qi etal. "Asemantic feature for human motion retrieval", May 15, 2013, pp. 399-407 (Year: 2013).*
(Continued)

*Primary Examiner* — Michael Le

(57) ABSTRACT

In one embodiment, a method includes, by one or more computing systems: receiving one or more non-video inputs, where the one or more non-video inputs include at least one of a text input, an audio input, or an expression input, accessing a K-NN graph including several sets of nodes, where each set of nodes corresponds to a particular semantic context out of several semantic contexts, determining one or more actions to be performed by a digital avatar based on the one or more identified semantic contexts, generating, in real-time in response to receiving the one or more non-video inputs and based on the determined one or more actions, a video output of the digital avatar including one or more human characteristics corresponding to the one or more identified semantic contexts, and sending, to a client device, instructions to present the video output of the digital avatar.

20 Claims, 15 Drawing Sheets

(51) Int. Cl.
   *G06N 20/00*     (2019.01)
   *G06V 40/16*     (2022.01)

(56) References Cited

U.S. PATENT DOCUMENTS

| | | | | |
|---|---|---|---|---|
| 10,522,143 | B2 | 12/2019 | Chandrasekaran | |
| 10,607,133 | B2 | 3/2020 | Li | |
| 2006/0290699 | A1* | 12/2006 | Dimtrva | G06K 9/6277 |
| | | | | 345/473 |
| 2013/0230255 | A1* | 9/2013 | Wang | G06F 16/583 |
| | | | | 382/201 |
| 2015/0213604 | A1* | 7/2015 | Li | H04N 7/147 |
| | | | | 345/473 |
| 2017/0039750 | A1* | 2/2017 | Tong | G06T 13/40 |
| 2018/0173942 | A1* | 6/2018 | Kim | G10L 21/06 |
| 2019/0034483 | A1* | 1/2019 | Millius | G06N 20/00 |
| 2019/0164327 | A1* | 5/2019 | Liu | G06T 13/40 |
| 2019/0341058 | A1* | 11/2019 | Zhang | G06V 40/172 |
| 2020/0099634 | A1 | 3/2020 | Chou | |
| 2020/0357382 | A1* | 11/2020 | Ogawa | G06N 3/02 |

OTHER PUBLICATIONS

International Search Report and Written Opinion for International Application No. PCT/KR2020/018574, dated Mar. 24, 2021.

Tian Qi et al. "A semantic feature for human motion retrieval", May 15, 2013, pp. 399-407.

Hu, Liwen, Shunsuke Saito, Lingyn Wei, Koki Nagano, Jaewoo Seo, Jens Fursund, Iman Sadeghi, Carrie Sun, Yen-Chun Chen, and Hao Li. "Avatar digitization from a single image for real-time rendering." *ACM Transactions on Graphics (ToG)* 36, No. 6 (2017): 1-14, Nov. 20, 2017.

Wei, Shih-En, Jason Saragih, Tomas Simon, Adam W. Harley, Stephen Lombardi, Michal Perdoch, Alexander Hypes, Dawei Wang, Hernan Badino, and Yaser Sheikh. "VR facial animation via multiview image translation." *ACM Transactions on Graphics (TOG)* 38, No. 4 (2019): 1-16, Jul. 12, 2019.

Habermann, Marc, Weipeng Xu, Michael Zollhoefer, Gerard Pons-Moll, and Christian Theobalt. "Livecap: Real-time human performance capture from monocular video." *ACM Transactions on Graphics (TOG)* 38, No. 2 (2019): 1-17, Jan. 25, 2019.

Vicon Nexus User Guide; Vicon Motion Systems Ltd., Jun. 19, 2017.

Vicon Tracker User Guide; Vicon Motion Systems Ltd., Sep. 28, 2020.

Dinur, Eran. *The Filmmaker's Guide to Visual Effects: The Art and Techniques of VFX for Directors, Producers, Editors and Cinematographers.* Taylor & Francis, 2017, Mar. 27, 2017.

Alexander, O., Rogers, M., Lambeth, W., Chiang, M. and Debevec, P., 2009. The digital emily project: photoreal facial modeling and animation. In Acm siggraph 2009 courses (pp. 1-80), Aug. 6, 2009.

Oculus VR, LLC. "Oculus Best Practices, Version 310-30000-02". http://static.oculus.com/documentation/pdfs/intro-vr/latest/bp.pdf, 2017.

Osipa, Jason. Stop staring: facial modeling and animation done right. John Wiley & Sons, 2010, Oct. 25, 2010.

Allen, Eric, and Kelly L. Murdock. *Body language: advanced 3D character rigging.* John Wiley & Sons, 2011, Mar. 31, 2011.

Brinkmann, Ron. *The art and science of digital compositing: Techniquest or visual effects, animation and motion graphics.* Morgan Kaufinann, 2008, May 24, 2008.

Raju, Purushothaman. *Character Rigging and Advanced Animation.* Apress, 2019.

ItSeez3D: Avatar SDK. 2017. (2017). https://avatarsdk.com, Downloaded from web Dec. 16, 2020.

Loom.ai. 2017. (2017). http://www.loom.ai, Downloaded from web Dec. 16, 2020.

* cited by examiner

GENERATING DIGITAL AVATAR

PRIORITY

This application claims the benefit under 35 U.S.C. § 119(e) of U.S. Provisional Patent Application No. 62/949,256, filed 17 Dec. 2019, which is incorporated herein by reference.

TECHNICAL FIELD

This disclosure relates generally to database and file management within network environments, and in particular relates to generating digital avatars.

BACKGROUND

In computing, an avatar is a graphical representation of a user or entity. It may take either a two-dimensional form as an icon or a three-dimensional form, as in games or virtual worlds. Avatars can be used as virtual embodiments of embodied agents, which are driven more or less by artificial intelligence rather than real people. Automated online assistants are examples of avatars used in this way.

DESCRIPTION OF EXAMPLE EMBODIMENTS

Machine-Learning System Overview

Figure 1:
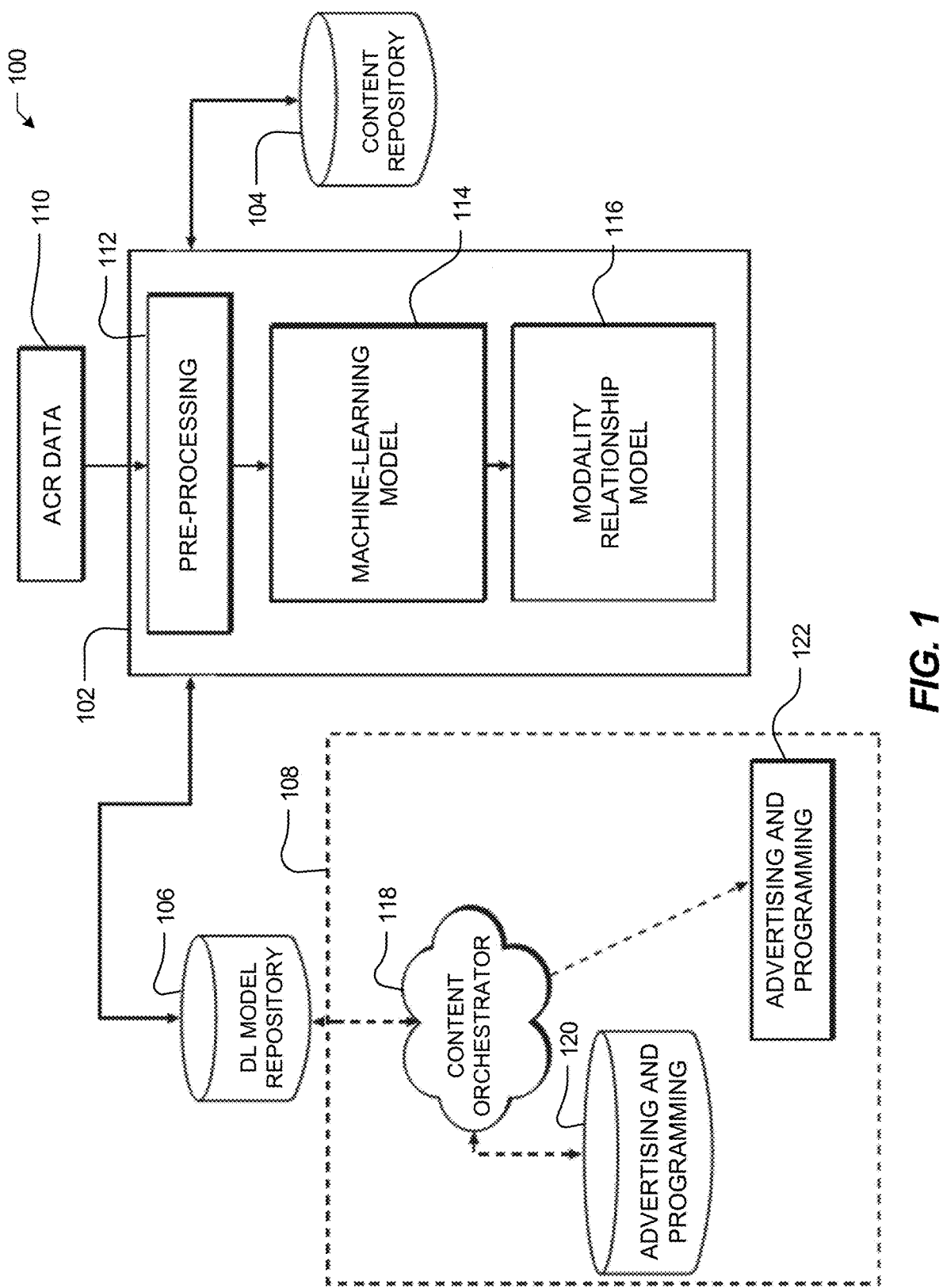
FIG. 1 illustrates an example prediction system.

FIG. 1 illustrates an example prediction system 100, in accordance with presently disclosed embodiments. As depicted by FIG. 1, the prediction system 100 may include a programming analytics system 102, one or more databases 104, 106, and a TV programming and advertising content subnetwork 108. In particular embodiments, the programming analytics system 102 may include a cloud-based cluster computing architecture or other similar computing architecture that may receive one or more user automatic content recognition (ACR) user viewing data 110, which may be provided by first-party or third-party sources, and provide TV programming content and advertising content to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying programming and advertising content and/or playing back programming and advertising content. Additionally, the programming analytics system 102 may be utilized to process and manage various analytics and/or data intelligence such as TV programming analytics, web analytics, user profile data, user payment data, user privacy preferences, and so forth. For example, in particular embodiments, the programming analytics system 102 may include a Platform as a Service (PaaS) architecture, a Software as a Service (SaaS) architecture, and an Infrastructure as a Service (IaaS), or other various cloud-based cluster computing architectures.

In particular embodiments, as further depicted by FIG. 1, the programming analytics system 102 may include a pre-processing functional block 112, a deep-learning model functional block 114, and a modality relationship model functional block 116. In particular embodiments, the pre-processing functional block 112, the deep-learning model functional block 114, and the modality relationship model functional block 116 may each include, for example, a computing engine. In particular embodiments, the pre-processing functional block 112 may receive the ACR user viewing data 110, which may include, for example, specific programming content (e.g., TV programming) recently viewed by one or more particular users or subgroups of users. For example, the ACR user viewing data 110 may include an identification of the recently viewed programming content (e.g., TV programs), metadata associated with the recently viewed programming content (e.g., TV programs), the particular timeslot (e.g., day-hour) the recently viewed programming content (e.g., TV programs) was viewed within, and the programming channel on which the programming content (e.g., TV programs) was viewed.

In particular embodiments, the pre-processing functional block 112 may then interface with the content database 104 to associate the recently viewed programming content included in the ACR user viewing data 110 with TV programming content stored by the database 104. For example, the TV programming content stored by the database 104 may include, for example, user or subgroup profile data, programming genre data, programing category data, programming clustering category group data, or other TV programming content or metadata that may be stored by the database 104. In particular embodiments, the ACR user viewing data 110 may include time-series data expressed in an hour context and/or day context. For instance, in a particular embodiment, time-series ACR user viewing data 110 may be received, for example, every 2-hour timeslot per 24-hour time period (12 timeslots total per 24-hour day). In some embodiments, different timeslots may be utilized (e.g., 8 3-hour timeslots per 24-hour time period, 24 1-hour timeslots per 24-hour time period, 48 30-minute timeslots per 24-hour time period, etc.) In particular embodiments, the pre-processing functional block 112 may also perform stratified sampling and data augmentation on the time-series based ACR user viewing data 110 to, for example, augment and up-sample minority classes (e.g., defined as user subgroups with less than 20 examples per unique class). In particular embodiments, the data augmentation may be based on the introduction of Gaussian noise via one or more multiplicative factors.

In particular embodiments, recognizing that certain classifications may include a multi-label classification problem with highly unbalanced classes, the pre-processing functional block 112 may also be utilized, for example, to split the time-series based ACR user viewing data 110 in an N number of datasets before providing to the deep-learning model functional block 114 for training, cross-validating, and testing. Thus, in particular embodiments, the pre-processing functional block 112 may perform the stratified multi-label sampling by, for example, accounting for the existence of one or more disjoint groups within a population and generating samples where the proportion of these groups is maintained. In particular embodiments, in a final pre-processing of the time-series based ACR user viewing data 110 before providing an output to the deep-learning model functional block 114 for training, cross-validating, and testing, the pre-processing functional block 112 may perform a multi-label Synthetic Minority Over-sampling Technique (SMOTE) on the time-series based ACR user viewing training dataset.

In particular embodiments, a final pre-processing of the time-series based ACR user viewing data 110 may be performed before providing an output to the deep-learning model functional block 114 for training, cross-validating, and testing. For example, in particular embodiments, the deep-learning model functional block 114 may receive an N number of datasets (e.g., N arrays of time-series based ACR user viewing data 110 in 2-hour timeslots) generate an N number of long short term (LSTM) layers based thereon. In particular embodiments, outputs of the LSTM layers of the deep-learning model functional block 114 may be combined into a single array utilizing, for example, a concatenation layer of the deep-learning model functional block 114. From the concatenation layer, the deep-learning model functional block 114 may then transfer the single array through one or more dense layers of the deep-learning model functional block 114.

In particular embodiments, from the one or more dense layers, the deep-learning model functional block 114 may then transfer the single array through a sigmoid output layer of the deep-learning model functional block 114. In particular embodiments, the sigmoid output layer of the deep-learning model functional block 114 may include, for example, a number of neurons (e.g., the number of neurons may be equal to the number of classes and/or classification labels) that may be utilized to classify the single array into individual classes, in which one or more final probabilities for individual classification labels may be calculated. In particular embodiments, the deep-learning model functional block 114 may also include a loss function that may be utilized to assign a higher weight to positive classification for individual classification labels, assuming that individual users and/or subgroups of users may typically not exceed more than a maximum number of users (e.g., N users).

For example, as further illustrated by FIG. 1, the programming analytics system 102 may provide the predictions of the individual classification labels to the database 106. In particular embodiments, as further depicted by FIG. 1, a network-based content orchestrator 118 may retrieve the predictions of the individual classification labels from the database 106. The content orchestrator 118 may then store the predictions of the individual classification labels together with TV programming and advertising content to be viewed in a programming and advertising content base 120. In particular embodiments, based on the predictions of the individual classification labels, the content orchestrator 118 may then provide TV programming and advertising content 122 to, for example, an end-user client device for user viewing.

Generating Digital Avatars

In particular embodiments, the disclosed technology includes generating digital humans (DHs). As used herein, "digital humans" may refer to a digital avatar. Digital humans (DHs) may be artificial intelligence enabled entities that have a hyper-realistic appearance, like real humans. Digital humans can have a hyper-realistic visual appearance, language and interaction capabilities like real humans. Digital humans may be powered by AI-driven systems that can generate audio-visual content as well as synthesize behavior and personality. AI systems powering digital humans may be trained using data generated and derived by understanding audio-visual and interaction behavior of real humans along with sophisticated machine learning algorithms. The disclosed technology may enable creation of ultra-real experiences for end-users to allow seamless communication between the digital and physical world. Digital humans may be driven by wide ranging controls that can be used to program look/appearance, expressions, speech, language, and other behavioral traits. Such programs and controls of the disclosed technology may enable rich and engaging experiences across multiple business and consumer domains. The audio-visual content generated using the disclosed technology may be rendered with wide ranging end-point devices, such as smartphones, wearable devices, TVs, digital screens, holographic displays, or any other media consumption device. Although this disclosure describes generating a digital human in a particular manner, this disclosure contemplates generating a digital human in any suitable manner.

Often times humans are characterized the way they look, the way they talk, the way they interact, and their overall personalities. Herein disclosed are one or more approaches for creating digital humans, which can be digital personas of humans that can be created, rendered, stored, and synthesized on machines. Furthermore, humans have various modalities for interaction such as vision, voice, gesture, and other forms of natural interaction. The disclosed technology may provide for digital humans that have similar sensing, cognition, and interaction capabilities as real humans along with the ability for machines and/or operators to control and manipulate the behavior for application specific purposes. Herein disclosed are one or more approaches for creating lifelike digital humans that may have sensing, interaction, understanding, and cognition capabilities like real humans, while at the same time being reactive, controllable, and having varying degrees of autonomous behavior for decision making. The digital humans of the disclosed technology may learn from interaction with real humans as well as from existing in-house or third-party services.

In particular embodiments, digital humans may be lifelike embodiments of real humans. Digital humans may provide a new form of fluid interaction that enable end-users to interact with machines in a natural way. In some embodiments of the disclosed technology, Digital humans may be created from data captured from real humans and have human-like attributes including (but not limited to) visual appearance, voice, expressions, emotions, behavioral, and personality traits. The disclosed technology may enable setting, programming, and updating these attributes. The disclosed technology may enable setting these attributes from data learned from a single individual or multiple individuals as desired. Digital humans may be driven completely or partially by real humans and/or one or more Artificial Intelligence (AI) processes/algorithms. These lifelike artificial humans may interact with an end-user through natural modalities such as speech, perception, reasoning, and other sensory mechanisms. In some embodiments, the disclosed technology may enable photo-realistic re-animation of videos using wide ranging inputs such as pre-captured video content, intermediate representations, or other modalities such as audio, gestures, reaction history, etc. The disclosed technology may learn from incoming data and develop a generative model to imitate and synthesize various digital attributes such as appearance, speech, emotion, personality, and others. The disclosed technology may go beyond current graphics-based re-animation methods that merely imitate pose, expression, and facial movements of the human driving a stylized character. The disclosed technology may combine methods from deep generative neural networks and large-scale graphs to learn, synthesize, and extrapolate behavioral characteristics of single/multiple individuals. Furthermore, the system may accept inputs from various sources to aid in decision making as well as adapt its behavior based on interactions with end-users to provide ultra-real and ultra-personal experiences for end-users.

In particular embodiments, the disclosed technology may have several features that distinguish over current technologies. As an example and not by way of limitation, the disclosed technology may generate hyper-real digital humans. These digital humans may be AI driven systems that look, talk, and behave like real humans in a digital world (e.g., display interface). In particular embodiments, the digital humans may be controlled and programmed for one or more desired tasks at hand. As another example and not by way of limitation, the digital humans may be driven by real humans, pre-programmed based on pre-defined controls, and/or may be driven autonomously through series of algorithms. As another example and not by way of limitation, the digital humans may be created by capturing data from a single individual, or by synthesizing or extrapolating data from multiple individuals. For instance, video from a single individual or multiple individuals may be used to create the digital humans. As another example and not by way of limitation, the digital humans may have senses that are powered by AI to have human-like look, voice, personality, expressions, and/or emotions that enable fluid interactions with end-users. The digital humans may have an enhanced understanding of the surrounds through wide ranging inputs. As another example and not by way of limitation, the digital humans may learn from interactions with end-users, understand, and/or adapt their behavior to end-users' preferences. As another example and not by way of limitation, the capabilities of a digital human, such as speech, perception, reasoning, and other cognitive capabilities may be learned by the disclosed technology that powers the creation of digital humans, as the interaction with end-user evolves.

In particular embodiments, one or more computing systems may generate a digital human/avatar. In particular embodiments, the one or more computing systems may be embodied as one or more computing systems as described herein that may be used to perform the functions described herein. As an example and not by way of limitation, the one or more computing systems may be a smartphone, a digital screen, a server, etc. In particular embodiments, the one or more computing systems may receive one or more inputs. In particular embodiments, the one or more inputs may include (but is not limited to) one or more non-video inputs. The non-video inputs may comprise at least one of a text input, an audio input, or an expression input. As an example and not by way of limitation, a user may provide a text input on a smartphone or an audio input on a smartphone. In particular embodiments, video input may be specifically not required by the one or more computing systems. Although this disclosure describes receiving inputs in a particular manner, this disclosure contemplates receiving inputs in any suitable manner.

In particular embodiments, the one or more computing systems may access a k-nearest neighbors ("K-NN") graph comprising a plurality of sets of nodes. As an example and not by way of limitation, the K-NN graph may have five nodes grouped together in a set, another four nodes grouped together in a set, and so on. While this disclosure discusses a K-NN graph, one or more other graphs may be used instead of the K-NN graph. In particular embodiments, each set of nodes may correspond to a particular semantic context of a plurality of semantic contexts. As an example and not by way of limitation, a set of nodes may correspond to a semantic context of a talking context. In particular embodiments, each semantic context may comprise one or more characteristics that pertain to the respective semantic context. As an example and not by way of limitation, a smiling context may include characteristics, such as happy tone in an audio input, a smiling expression, and the like. In particular embodiments, analysis may be performed on text input, audio input, expression input, and video inputs to identify characteristics of a particular semantic context. Certain inputs may be grouped together when training a machine-learning model as described herein to form a particular semantic context. In particular embodiments, each of the plurality of semantic contexts may be indicative of an expression. As an example and not by way of limitation, one of the plurality of semantic contexts may include a sad expression. In particular embodiments, each node in a set of nodes may be associated with an intensity of an expression corresponding to the semantic context of the set of nodes. As an example and not by way of limitation, one node in a set of nodes of an angry semantic context may be a low intensity node, such as an audio input where a user has a frustrated tone. As another example and not by way of limitation, another node in the set of nodes of the angry semantic context may be a high intensity node, such as an audio input including swear words and high volume. In particular embodiments, the K-NN graph may be generated based on identified relationships between different modalities of previous inputs and the corresponding outputs. As an example and not by way of limitation, a relationship may be identified between text inputs and audio inputs and the respective outputs. For instance, for an audio input "what is the weather today," a relationship may be identified between both the text input (generated using automatic speech recognition) and the audio input and their corresponding outputs. In particular embodiments, the relationships between different modalities of previous inputs and corresponding outputs may be mapped to the K-NN graph. In particular embodiments, the K-NN graph may be generated using one or more machine-learning models that identify relationships between two or more modalities. As an example and not by way of limitation, a machine-learning model identifying a relationship between text inputs and audio inputs and their corresponding outputs may be used to generate a K-NN graph as described herein. Although this disclosure describes accessing a K-NN graph in a particular manner, this disclosure contemplates accessing a K-NN graph in any suitable manner.

In particular embodiments, the one or more computing systems may process one or more inputs using a K-NN graph. In particular embodiments, the one or more computing systems may process one or more non-video inputs using a K-NN graph to identify one or more semantic contexts corresponding to the one or more sets of nodes that relate to the inputs. As an example and not by way of limitation, a K-NN graph may be used to process a user input, "Hi! How are you doing today?" as being in the smiling semantic context. In particular embodiments, the one or more computing systems may use the K-NN graph to identify one or more nodes of the K-NN graph that correspond to the user input. Each of the identified nodes may be associated with a set of nodes, where each set of nodes may be associated with a semantic context. In particular embodiments, the one or more computing systems may map a sequence of nodes that correspond to the one or more inputs. As an example and not by way of limitation, for a user input "Hello, how are you?" the one or more computing systems may identify nodes corresponding to several different semantic contexts, such as a nodding semantic context, a talking semantic context, and a smiling semantic context. Although this disclosure describes processing one or more inputs in a particular manner, this disclosure contemplates processing one or more inputs in any suitable manner.

In particular embodiments, the one or more computing systems may determine one or more actions to be performed by a digital avatar. In particular embodiments, the one or more computing systems may determine one or more actions to be performed by a digital avatar based on the one or more identified semantic contexts. More specifically, the one or more computing systems may use the K-NN graph to identify the semantic context associated with an input and determine an action based on the identified semantic context. In particular embodiments, there may be actions associated with semantic contexts of the K-NN graph. As an example and not by way of limitation, for a smiling semantic context, an action to be performed by the avatar may be smiling. For instance, for a user input (e.g., audio input with a happy/light/cheerful tone) the one or more computing systems may use the K-NN graph to identify the semantic context (e.g., smiling context) and one or more actions a digital avatar may perform for the given semantic context. In particular embodiments, each node of a K-NN graph may have one or more actions corresponding to the respective node. As mentioned herein, each node may have an intensity of expression. The action may also correspond to the intensity associated with the action. As an example and not by way of limitation, for a low intensity smiling context, an action to be performed by the digital avatar would be a slight smile. As another example and not by way of limitation, for a high intensity smiling context, an action to be performed by the digital avatar would be a big smile touching the eyes of the digital avatar. Although this disclosure describes determining one or more actions to be performed in a particular manner, this disclosure contemplates determining one or more actions to be performed in any suitable manner.

In particular embodiments, the one or more computing systems may generate a video output of a digital avatar. The video output may be generated in real-time responsive to receiving an input from a user and based on the determined one or more actions the digital avatar is to perform. In particular embodiments, the digital avatar may comprise one or more human characteristics corresponding to the one or more identified semantic contexts. As an example and not by way of limitation, if the identified semantic context is a smiling semantic context, the digital avatar may comprise a smile for one of the human characteristics that correspond to the smiling semantic context. In particular embodiments, the human characteristics may include photorealistic human features. In particular embodiments, the video output may comprise the one or more actions to be performed by the digital avatar. As an example and not by way of limitation, if an action to be performed by the avatar is determined to be chuckling, then the video output may include the digital avatar chuckling. In particular embodiments, the video output may comprise a rendering of a sequence of actions to be performed by the digital avatar. The one or more computing systems may determine the sequence of actions to be performed by the digital avatar as described herein. As an example and not by way of limitation, if the sequence of actions comprises the digital avatar first nodding, second talking, and lastly smiling, the video output may include a digital avatar performing the actions in sequence. Although this disclosure describes generating a video output in a particular manner, this disclosure contemplates generating a video output in any suitable manner.

In particular embodiments, the one or more computing systems may send instructions to present the video output to a client device. In particular embodiments, a user may interface the one or more computing systems at a client device. As an example and not by way of limitation, the user may be interfacing the one or more computing systems through a digital display. After the one or more computing systems generates the video output as described herein, the one or more computing systems may send instructions to the client device (e.g., digital display) to present the video output of the digital avatar performing the sequence of actions. Although this disclosure describes sending instructions to present a video output in a particular manner, this disclosure contemplates sending instructions to present a video output in any suitable manner.

In particular embodiments, the digital avatar may be used in a wide range of applications including business, consumer, enterprise, and entertainment applications. In particular embodiments, the one or more computing systems may send instructions to present video output at a client device that is used as an interface for interacting with machines. Traditionally, people interact with machines in the form of a keyboard, mouse, or other input devices. As an example and not by way of limitation, people may typically interact with their personal computers via keyboard, mouse, or other input. In particular embodiments, people may be provided an interface of interacting with a digital human/avatar to interact with machines. This may allow people to use natural modalities, such as voice, vision, gestures, and other forms of man-made modalities to interact with machines. In particular embodiments, the one or more computing systems may send instructions to present video output at a client device used for a customer service application. In particular embodiments, the one or more computing systems for generating a digital avatar may provide an interface to a knowledge graph engine, question answering engine, or any form of a digital assistant through the digital avatar. As an example and not by way of limitation, a video output of a digital avatar may be presented on a digital display of a shopping mall complex to provide information to consumers. For instance, if consumers have questions regarding locations of shops of the shopping mall complex, where to purchase certain items, and/or general queries, the consumers may provide an input at the digital display to receive answers presented by a digital avatar. As disclosed herein, the video output to the digital display may comprise a video output of a digital avatar performing one or more actions in sequence based on the received inputs from consumers. In particular embodiments, a video output of multiple digital avatars may be presented to a digital display. In particular embodiments, one or more computing systems for generating a digital avatar may send instructions to a plurality of different devices corresponding to different applications. As an example and not by way of limitation, a video output of a digital avatar may be used for a content creation application, a custom news anchor application, language learning application, an on-demand weather application, an in-car assistant application, a makeup consultant application, a visual merchandising display, a virtual banking application, and other different applications. For instance, if a news organization would like to present daily news for their viewers, then content in the form of news (inputted as text, audio, expression input) may be provided to the one or more computing systems for generating digital avatars to generate a video output of the digital avatar presenting the daily news for viewers. The video output may be presented to viewers tuning into the channel of the news organization or the like. Although this disclosure describes a digital avatar used in a particular manner, this disclosure contemplates a digital avatar used in any suitable manner.

Figure 2A:
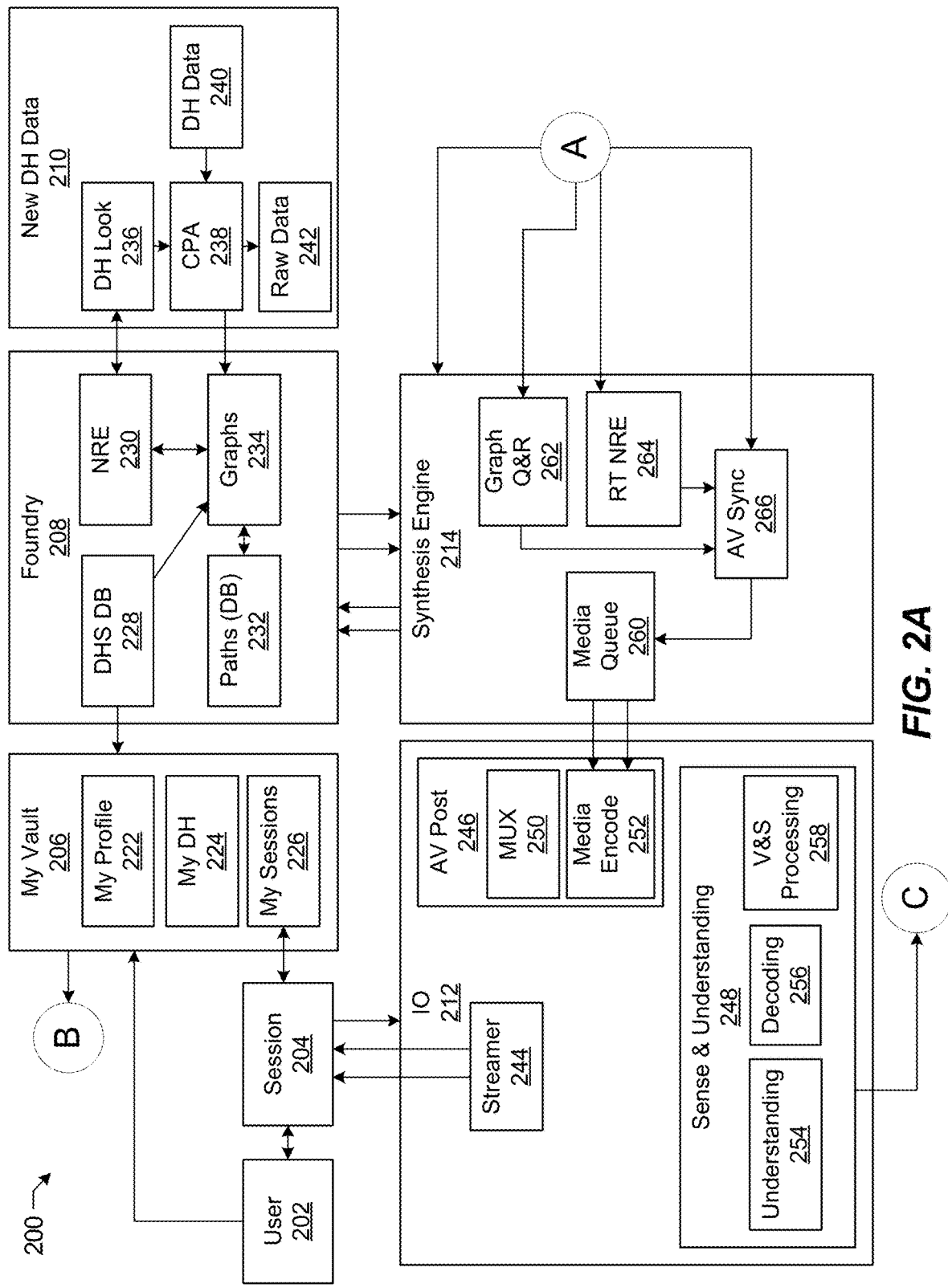
FIGS. 2A-2B illustrate an example system architecture for generating digital avatars.
Figure 2B:
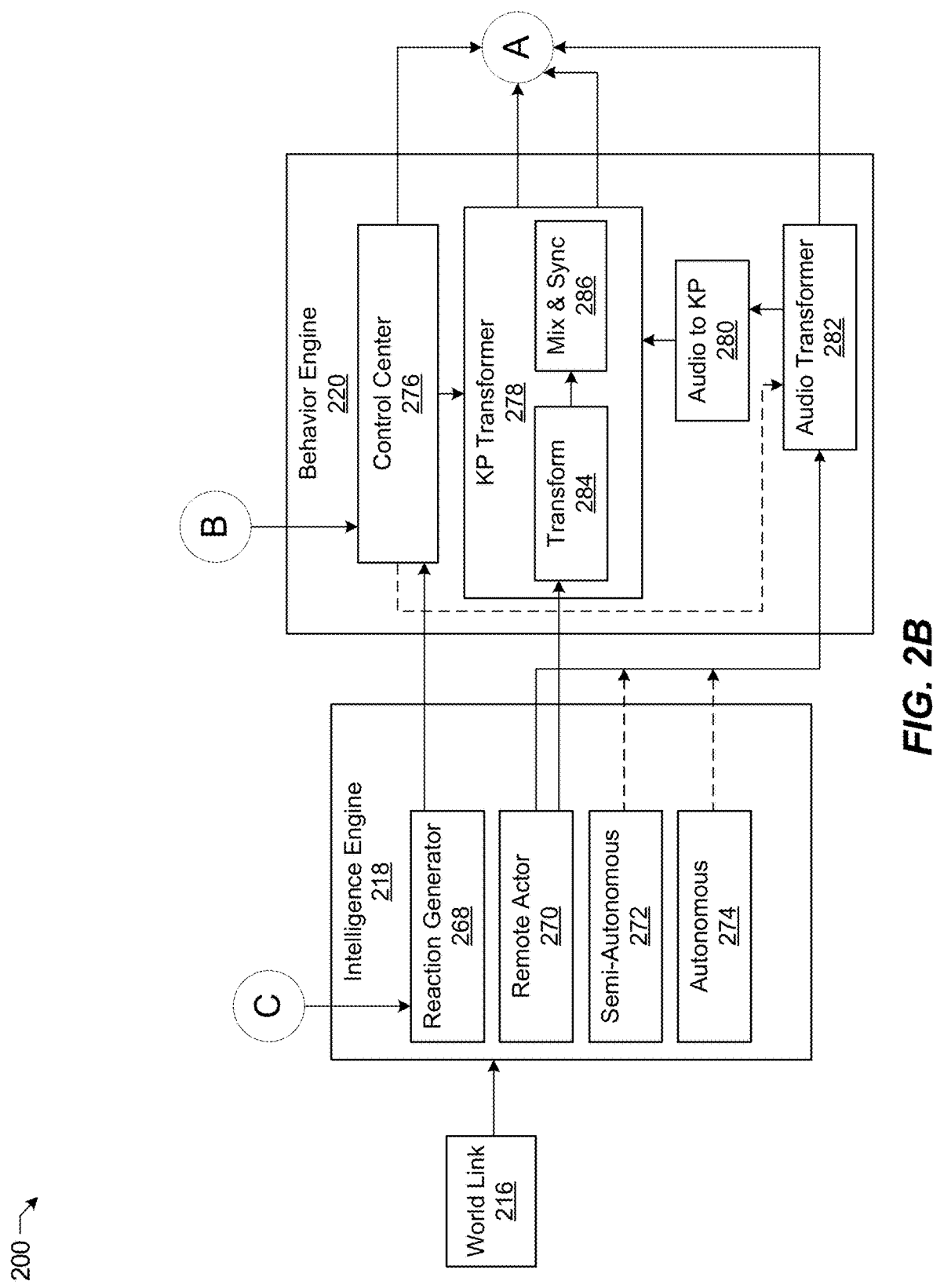

FIGS. 2A-2B illustrate an example system architecture 200 for generating digital avatars. The system architecture 200 may be associated with a system for generating digital humans/avatars. In particular embodiments, a digital human (DH) or digital avatar may be a lifelike persona of a human created by the system disclosed herein that can be rendered, animated, and has interaction capabilities such as speech, vision, and cognitive understanding. The digital humans/avatars may be created from statistical data recorded from real humans and/or through synthesis from derived data. Referring to FIG. 2A, the system architecture 200 may include a user 202, a session 204, a my vault 206, a foundry 208, new digital human (DH) data 210, input/output (IO) module 212, a synthesis engine 214, a world link 216 (shown in FIG. 2B), an intelligence engine 218 (shown in FIG. 2B), and a behavior engine 220 (shown in FIG. 2B). While a particular layout and number of components of the system architecture 200 are shown, the system architecture 200 may be rearranged with a different layout and any number of components. As an example and not by way of limitation, there may be multiple users in the system architecture 200. As another example and not by way of limitation, the session 204 may be included in the my vault 206. While a particular depiction of data flows is shown, this disclosure contemplates additional or less data flows in the system architecture 200.

In particular embodiments, the user 202 may be an end-user who interacts with the system architecture 200 as described herein. In particular embodiments, the user 202 may be an input received from the user 202 via a client device. As an example and not by way of limitation, the user 202 may be replaced by a smartphone used by the user 202 to interface the system architecture 200. In particular embodiments, the user 202 may interface the sessions 204. In particular embodiments, the user 202 may send one or more user preferences to the my vault 206. The one or more user preferences may include one or more of how the user may want to interact with the system (e.g., a digital human/avatar), behavior, appearance, voice, and other characteristics of a digital human/avatar. The user 202 may use a client device to send the one or more user preferences to the my vault 206. As an example and not by way of limitation, a user 202 may select one or more preferences in an application interface and send the one or more preferences to the system associated with the system architecture 200.

In particular embodiments, the session 204 may be one or more interactions between the system architecture 200 of the disclosed technology and the user 202. During each session 204, a user may engage with the system associated with the system architecture 200 through one or more machine interfaces and/or natural interfaces. As an example and not by way of limitation, the user 202 may engage with the system through a keyboard, touch, speech, vision, gestures, and others. In particular embodiments, the session 204 may typically take place on a hybrid of a client device and a server. As an example and not by way of limitation, the session 204 may take place on a media consumption device (e.g., smartphone) and the cloud. In particular embodiments, the session 204 may receive audio input and video input from a streamer 244 of the 10 212. In particular embodiments, when an audio input is described herein, the audio input may be an incoming audio feed. As an example and not by way of limitation, the audio feed may be from recorded data, a user 202, and/or a remote actor/operator. The audio input may be generated by one or more different parts of the system architecture 200 through one or more machine-learning and synthesis processes. In particular embodiments, when a video input is described herein, the video input may be an incoming video feed. As an example and not by way of limitation, the video feed may be from recorded data, a user 202, and/or a remote actor/operator. In particular embodiments, the video feed may be generated by one or more different parts of the system architecture 200 through one or more machine-learning and synthesis processes. In particular embodiments, the session 204 may capture sensing data and send the sensing data to IO 212. In particular embodiments, the sensing data may be data detected by one or more sensors facing a user 202 for understanding the state of the user. As an example and not by way of limitation, sensing data may be captured by a camera facing the user 202. In particular embodiments, sessions 204 may send session information to the my vault 206. In particular embodiments, the session information may include one or more of a history, previous conversations, and the like.

In particular embodiments, the my vault 206 may store a user profile 222 (my profile), digital human profile 224 (my DH), and interactions 226 (my sessions) carried out during each session. The user profile 222 may include one or more user preferences and any other user defined settings about how the user 202 may want to interact with the system. The user preferences may be received from the user 202. The digital human profile 224 may include user preferences about behavior, appearance, voice, and other characteristics of the digital human/avatar. In particular embodiments, the characteristics may be controlled, changed, and updated based on direct inputs from the user and/or by learning and adapting from data from user interactions. In particular embodiments, the my vault 206 may receive digital human customization data from a digital humans database 228.

In particular embodiments, the foundry 208 may include a digital human database (DH DB) 228, neural rendering engine (NRE) 230, paths 232, and graphs 234. In particular embodiments, graphs 234 may be appearance similarity based on graphical representations for organizing data collected in new digital human (DH) data 210. A visual look may be generated by following paths 232 along similarity graphs 234. In particular embodiments, the paths 232 may be stored in a paths module and the graphs 234 may be stored in the DH DB 228. In particular embodiments, the NRE 230 may facilitate augmenting and interpolating the appearance graph with machine learning and a synthesis process using data generated and/or derived from data received from digital human look data 236 of the new DH data 210. In particular embodiments, the foundry 208 may send audio input and video input data to the synthesis engine 214. The audio input and the video input data may come from the graphs 234. In particular embodiments, the foundry 208 may receive one or more queries to graphs 234 and paths 232 from the synthesis engine 214. In particular embodiments, the synthesis engine 214 may send keypoints to the foundry 208. In particular embodiments, the keypoints may be landmark points or interest points detected by various computer vision and video analysis processes that highlight and characterize stable and reoccurring regions in video. The landmark points may be called keypoints and are tracked throughout a video.

In particular embodiments, the new DH data 210 may be a module where data 240 is recorded, curated, organized and/or indexed through a curation, parsing and annotation (CPA) module 238 and stored in raw data 242. The data 240 may be used by various parts of the system architecture 200 to develop digital humans/avatars and personas of the digital avatars. The data 240 may be used by the system and/or by injecting additional knowledge (e.g., annotations) and/or via a statistical/machine learning process to transform the data 240. In particular embodiments, the digital humans/avatars may be created directly from the recorded data 242 and/or through transforming the data and deriving insights via various algorithms.

In particular embodiments, the synthesis engine 214 may receive input from the behavior engine 220 in the form of keypoints and audio input. In particular embodiments, the synthesis engine 214 may provide outputs to the 10 module 212 and the foundry 208. In particular embodiments, the synthesis engine may include two submodules, the graph query and retrieval (Graph Q&R) 262 and runtime neural rendering engine (RT NRE) 264. The graph Q&R 262 may interface with the foundry 208, and the RT NRE 264 may interface with graph Q&R 262 (internally) along with foundry 208 and 10 module 212 (e.g., externally within the system). Graph Q&R 262 may query graphs 234 of the foundry 208in the form of metadata and/or keypoint queries and receives audio visual data from the graphs 234. In particular embodiments, the RT NRE 264 may receive input from the behavior engine 220 in the form of keypoints and audio and synthesize media content based on machine learning and other statistical processes. The synthesis engine 214 may use the AV sync 266 to combine the audio and keypoint data and output to the media queue 260, where the media queue 260 may send audio input data and video input data to the media encode module 252 of the 10 module 212. In particular embodiments, the synthesized data can involve transformation of visual look, expressions, surroundings, and other appearance related characteristics. The synthesized data can also include transformations related to speech and audio coming in from the behavior engine 220.

In particular embodiments, the 10 module 212 may output from the system to the user 202. The 10 module 212 may include an audio-visual post processing module 246 and streaming module 244. The AV post module 246 may include a MUX 250 and a media encode module 252. In particular embodiments, input to the system may include sensing and understanding module 248, which may include an understanding module 254, a decoding module 256, and a V&S processing module 258. In particular embodiments, wide ranging sensors may be included with the system architecture 200 to sense the environment. 10 module 212 may have multiple modules that process upstream (e.g., to the system from the user) and downstream (e.g., from the system to the user) information. AV post module 246 may perform audio visual post processing to perform media processing operations such as transcoding and others. Streaming module 244 may handle streaming media to the device of the user 202 for consumption and interaction by the user 202. Sending and understanding module 248 may process incoming sensing data from the user 202 and feed it to a reaction generator 268 (shown in FIG. 2B) of the intelligence engine 218 (shown in FIG. 2B) for decision making by the system disclosed herein.

Referring to FIG. 2B, other components of the system architecture 200 are shown. In particular embodiments, the world link 216 may send data to the intelligence engine 218. In particular embodiments, the intelligence engine 218 may be a driver and orchestrator of the example system. In particular embodiments, the intelligence engine 218 may be operated by a remote actor 270, in a semi-autonomous 272, or autonomous 274 way. The intelligence engine 218 may receive inputs from 10 module 212 which may include sending information from the user 202. Based on the inputs, the intelligence engine 218 may generate reactions that need to be executed by the digital human/avatar for carrying out real-time interactions with the user 202. The intelligence engine 218 may maintain an overall state of the system along with an emotional and interaction state of the digital human/avatar. In remote actor mode 270, the system may be driven partly or fully by a remote actor who provides keypoints and voice for a digital human/avatar. In semi-autonomous mode 272 and autonomous mode 274, keypoints, audio, mannerisms, or other behavioral attributes may be generated by the system. Intelligence engine 218 may query and retrieve information through other third-party systems, knowledge graphs, etc. through world link 216.

In particular embodiments, the behavior engine 220 may be configured for controlling and driving the behavior of a digital human/avatar. The behavior engine 220 may receive inputs from the intelligence engine 218 which can be modulated by a system operator. In particular embodiments, the operator may be an entity who has access to the system or can be a program that has predefined or learned rules. The behavior engine 220 may also receive inputs from my vault 206 about specific preferences about the user 202 and digital human/avatar. The behavior engine 220 may include a control center 276, a KP transformer 278, audio to KP module 280, and audio transformer 282. The control center 276 may be a command center for transforming the incoming keypoint and audio signals from the intelligence engine 218. KP transformer 278 may handle transforming the keypoints as per desired specifications using a transformer 284 and a mix and sync module 286. As an example and not by way of limitation, the incoming keypoints may involve a digital human looking straight ahead, but based on inputs from the control center 276, and/or orientation, shape, identity, expression, or any such meta-attribute of the keypoints, can be transformed. Audio transformer 282 may transform audio based on required specifications. The transformations may involve various audio and speech attributes, such as language, intonations, voice identity, accent, voice cloning, etc. The transformations may be performed using various filters, transformations, and/or machine learning models. In particular embodiments, the audio to KP transformer 280 may be a machine learning model that predicts keypoints given a set of incoming audio stream. In particular embodiments, the keypoints may undergo further transformation such as mixing and animating keypoints from a predefined set of animation curves and statistical models.

Figure 3:
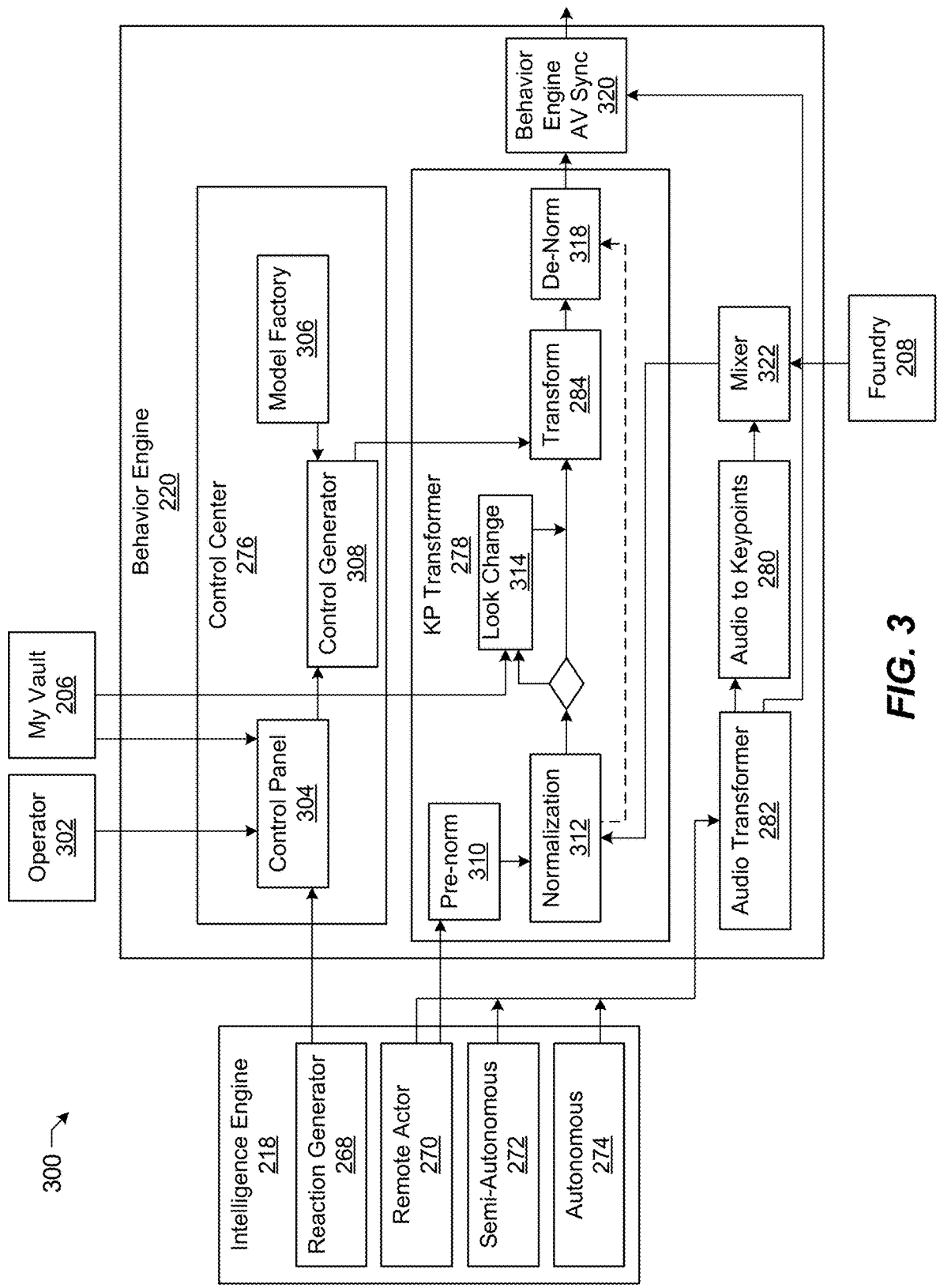
FIG. 3 illustrates an example data flow between components of a system for generating digital avatars.

Referring to FIG. 3, an example data flow 300 between components of a system for generating digital avatars is shown. The example data flow 300 involves components of the system architecture 200. In particular embodiments, the example data flow 300 involves the data flow between the intelligence engine 218, my vault 206, foundry 208, and the behavior engine 220. Although this disclosure shows the example behavior engine 220 with particular components arranged in a particular way, this disclosure contemplates a behavior engine 220 with other components arranged in any suitable way. In particular embodiments, the control center 276 may include a control panel 304 that receives input from an operator 302 and my vault 206, a control generator 308, and a model factory 306. The control panel 304 may be for the operator to be able to give inputs about behavior of a digital human/avatar. The control generator 308 may combine the controls from reaction generator 268, control panel 304, and model factory 306 and generate controls for transformations. The model factory 306 may be a pre-stored statistical model. In particular embodiments, the KP transformer 278 may also include (additionally from what was previously described) a pre-normalization module 310, a normalization module 312, a look change 314 receiving inputs from my vault 206, and a de-normalization module 318. The normalization module 312 may normalize incoming keypoints to a pre-determined coordinate system. The look change 314 may perform an identity or appearance change of the digital human/avatar. The de-normalization module 318 may denormalize the keypoints. The behavior engine 220 may also include a mixer 322 receiving inputs from the audio to keypoints module 280 and the foundry 208, where the mixer 322 may send data to the normalization module 312. The behavior engine 220 may also include a behavior engine AV Sync 320 that receives an input from the audio transformer 282 and the de-normalization module 318 of the KP transformer 278.

Figure 4:
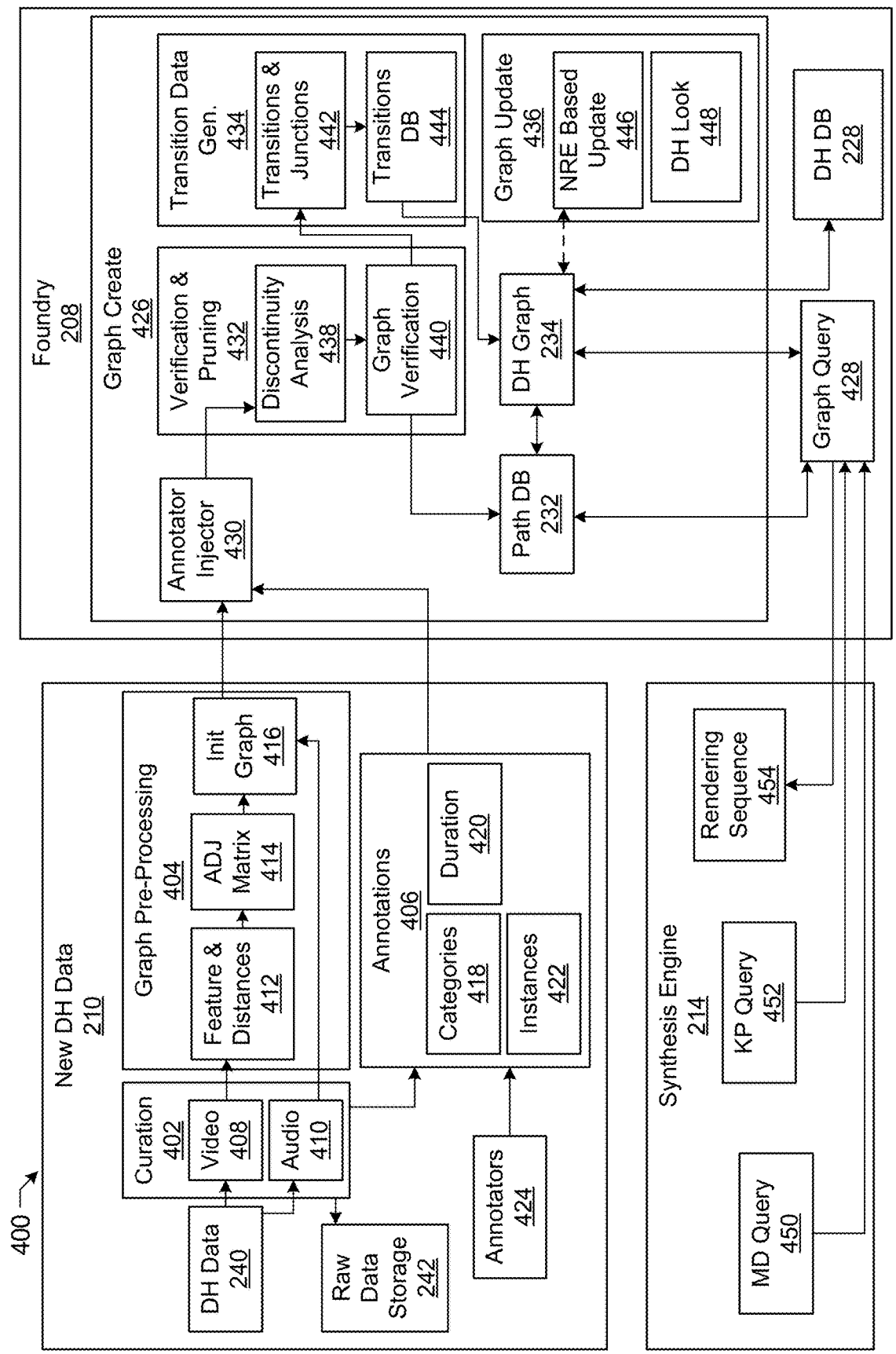
FIG. 4 illustrates another example data flow between components of a system for generating digital avatars.

Referring to FIG. 4, an example data flow 400 between components of a system for generating digital avatars is shown. The example data flow 400 involves components of the system architecture 200. In particular embodiments, the example data flow 400 involves the data flow between the new DH data 210, foundry 208, and the synthesis engine 214. Although this disclosure shows the example new DH data 210, foundry 208, and synthesis engine 214 with particular components arranged in a particular way, this disclosure contemplates new DH data 210, foundry 208, and synthesis engine 214 with other components arranged in any suitable way. In particular embodiments, the new DH data 210 may include a curation module 402, a graph pre-processing module 404, annotations 406, and annotators 424. The curation module 402 may organize, index, and/or clean DH data 240. The graph pre-processing module 404 may compute statistical similarity of incoming data. The annotations 406 may be external knowledge infused in the system about incoming data to be used for further processing and machine learning. The curation module 402 may include a video module 408 and audio module 410 to receive video and audio inputs from DH data 240. The graph pre-processing module 404 may include a feature & distances 412, an ADJ matrix module 414, and an initial graph 416. The feature and distances 412 may be an internal representation used for computing appearance similarity. The initial graph 416 may be an initial graph generated by the system based on incoming data and appearance similarity. Annotations 406 may include categories 418, duration 420, and instances 422.

In particular embodiments, the foundry 208 may include (additionally from what was previously described) a graph create 426 and a graph query 428. The graph create 426 may include an annotator injector 430, a verification and pruning 432, transition data gen 434, path DB 232, DH graph 234, and graph update 436. The annotator injector 430 may be a process of mapping external knowledge to the incoming data. The verification and pruning 432 may perform a verification and pruning process for appearance similarity graphs. The verification and pruning 432 may include a discontinuity analysis 438 and a graph verification 440. The transition data gen 434 may include transitions and interpolation generation based on graph and appearance similarity representation. The transition data gen 434 may include transitions and junctions 442 and transitions database 444. The graph update 436 may be a module configured to update the graphs. The graph update 436 may include an NRE based update 446 and a digital human look 448.

In particular embodiments, the synthesis engine 214 may include (additionally from what was previously described) a MD query 450, a KP Query 452, and a rendering sequence 454. The MD query 450 may be a query in metadata format for graphs. The KP query 452 may be a query in keypoint format for graphs. The rendering sequence 454 may be a rendering sequence ready for streaming to downstream devices.

Figure 5:
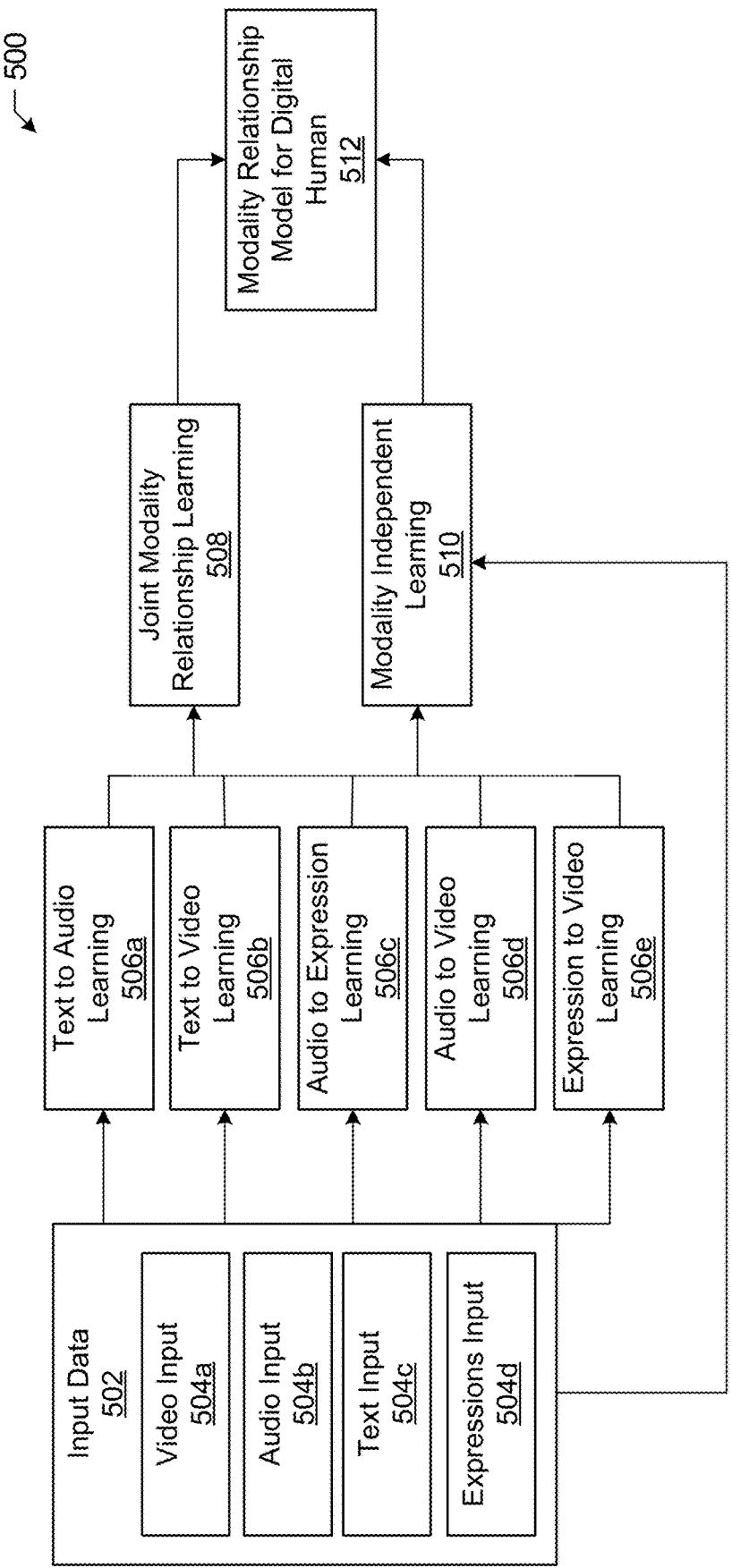
FIG. 5 illustrates an example machine-learning process for determining relationships between different modalities.

FIG. 5 illustrates an example machine-learning process 500 for determining relationships between different modalities. In particular embodiments, input data 502 may be received. The input data 502 may comprise video input 504a, audio input 504b, text input 504c, and expressions input 504d. The input data 502 may be fed into a plurality of machine learning models 506. In particular embodiments, text input 504c and audio input 504b may be fed into a text to audio learning model 506a that identifies a relationship between the text input 504c and audio input 504b. In particular embodiments, text input 504c and video input 504a may be fed into a text to video learning model 506b that identifies a relationship between the text input 504c and the video input 504a. In particular embodiments, the audio input 504b and expressions input 504d may be fed into an audio to expression learning model 506c that identifies a relationship between the audio input 504b and expressions input 504d. In particular embodiments, the audio input 504b and video input 504a may be fed into an audio to video learning model 506d that identifies a relationship between the audio input 504b and video input 504a. In particular embodiments, the expressions input 504d and the video input 504a may be fed into an expression to video learning model 506e that identifies a relationship between the expressions input 504d and the video input 504a. In particular embodiments, the output of the machine-learning models 506 may be sent to both a joint modality relationship learning model 508 and a modality independent learning model 510. The modality independent learning model 510 may also receive the input data 502. In particular embodiments, the joint modality relationship learning model 508 may be combined with the modality independent learning model 510 to generate a modality relationship model for digital human 512. The modality relationship model for digital human 512 may be used to generate a digital human based on a received input from a user as described herein.

Figure 6:
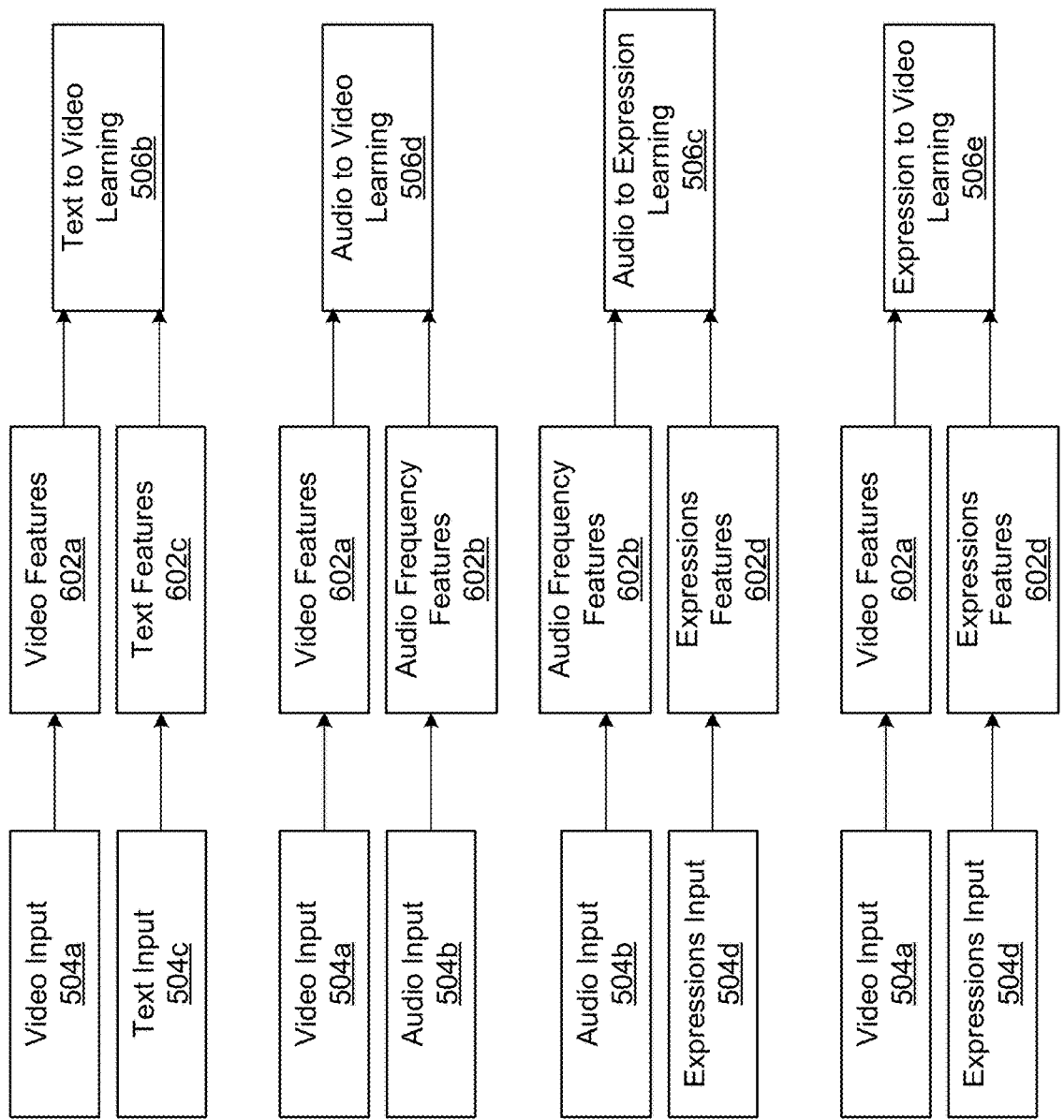
FIG. 6 illustrates example machine-learning processes for determining relationships between different modalities.

FIG. 6 illustrates example machine-learning processes for determining relationships between different modalities. Features 602 may be extracted from input data 502 to be fed into a machine-learning model 506. In particular embodiments, video features 602a are extracted from video input 504a and text features 602c are extracted from text input 504c to be fed into a text to video learning model 506b. In particular embodiments, video features 602a are extracted from video input 504a and audio frequency features 602b are extracted from audio input 504b to be fed into an audio to video learning model 506d. In particular embodiments, audio frequency features 602b are extracted from audio input 504b and expressions features 602d are extracted from expressions input 504d to be fed into audio to expression learning model 506c. In particular embodiments, video features 602a are extracted from video input 504a and expressions features 602d are extracted from expressions input 504d to be fed into an expression to video learning model 506e.

Figure 7:
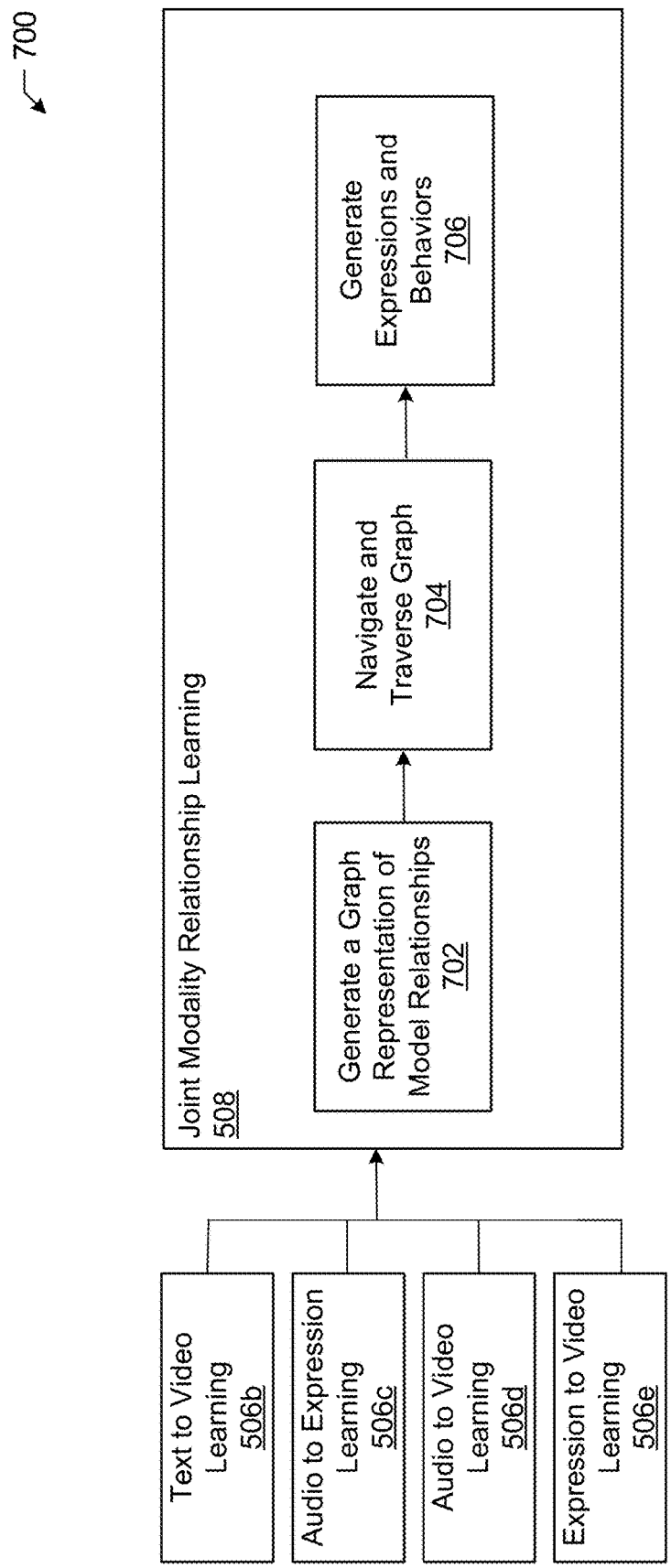
FIG. 7 illustrates an example process for generating expressions and behaviors of a digital avatar.

FIG. 7 illustrates an example process 700 for generating expressions and behaviors of a digital avatar. In particular embodiments, machine learning models 506 may be fed into the joint modality relationship learning model 508. The process 700 may start with step 702, where the joint modality relationship learning model 508 may generate a graph representation of model relationships. As an example and not by way of limitation, the join modality relationship learning model 508 may be used to generate a K-NN graph. At step 704, the joint modality relationship learning model 508 may navigate and traverse the graph. When an input is received, the join modality relationship model 508 may navigate and traverse the graph to generate expressions and behaviors of a digital human/avatar in step 706.

Figure 8:
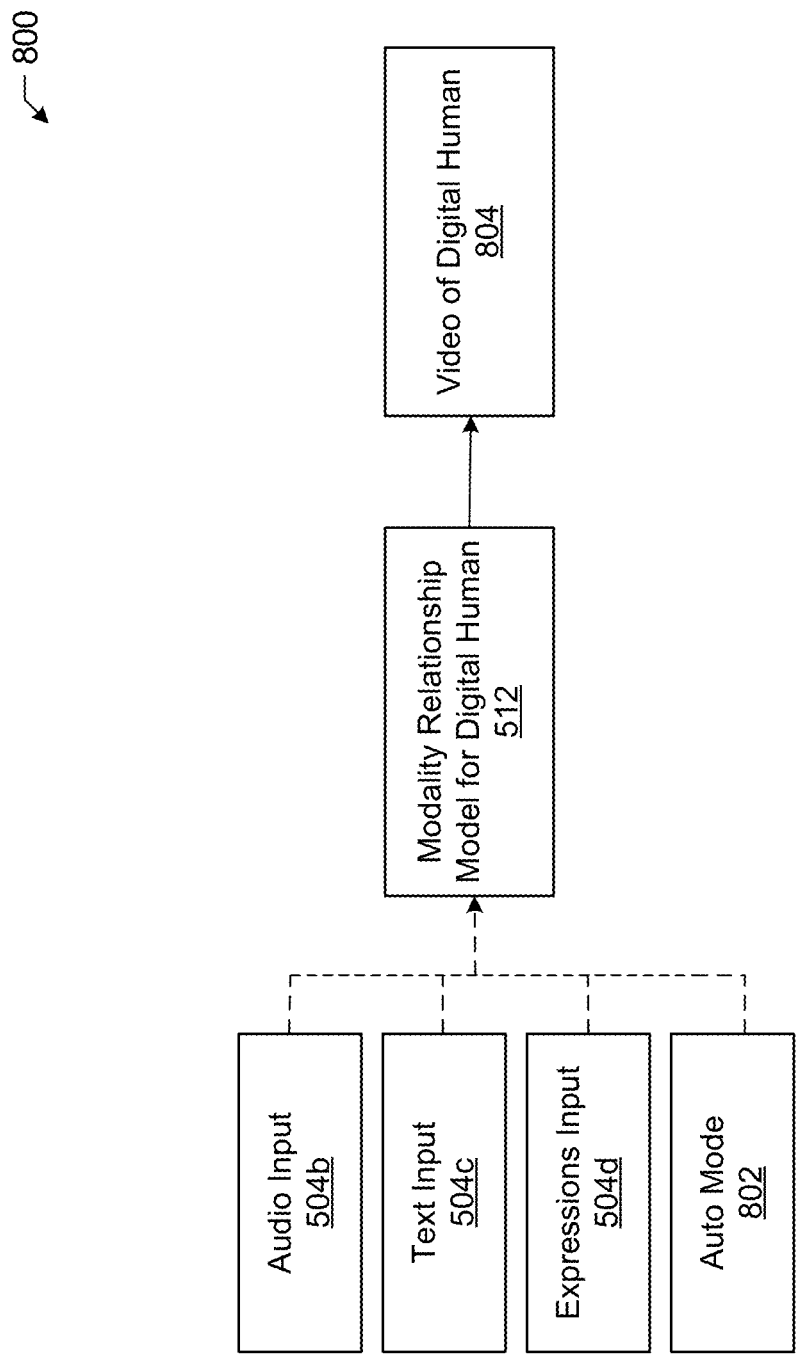
FIG. 8 illustrates an example process of generating a video of a digital avatar.

FIG. 8 illustrates an example process 800 of generating a video of a digital avatar. In particular embodiments, the process 800 may begin with one or more inputs 504 and/or a selection of an autonomous mode 802. In particular embodiments, the one or more received inputs 504 may be fed into the modality relationship model for digital human 512 to generate a video of a digital human 804. In particular embodiments, if an autonomous mode 802 were selected, then the system may traverse the graph mapping the relationships between different modalities without any specific start or end point by select a node on a predetermined prior node. In particular embodiments, if one or more inputs 504 are received, then the system can traverse the graph mapping the relationships between different modalities with a specific position in the graph corresponding to a node associated with the received one or more inputs 504.

Figure 9:
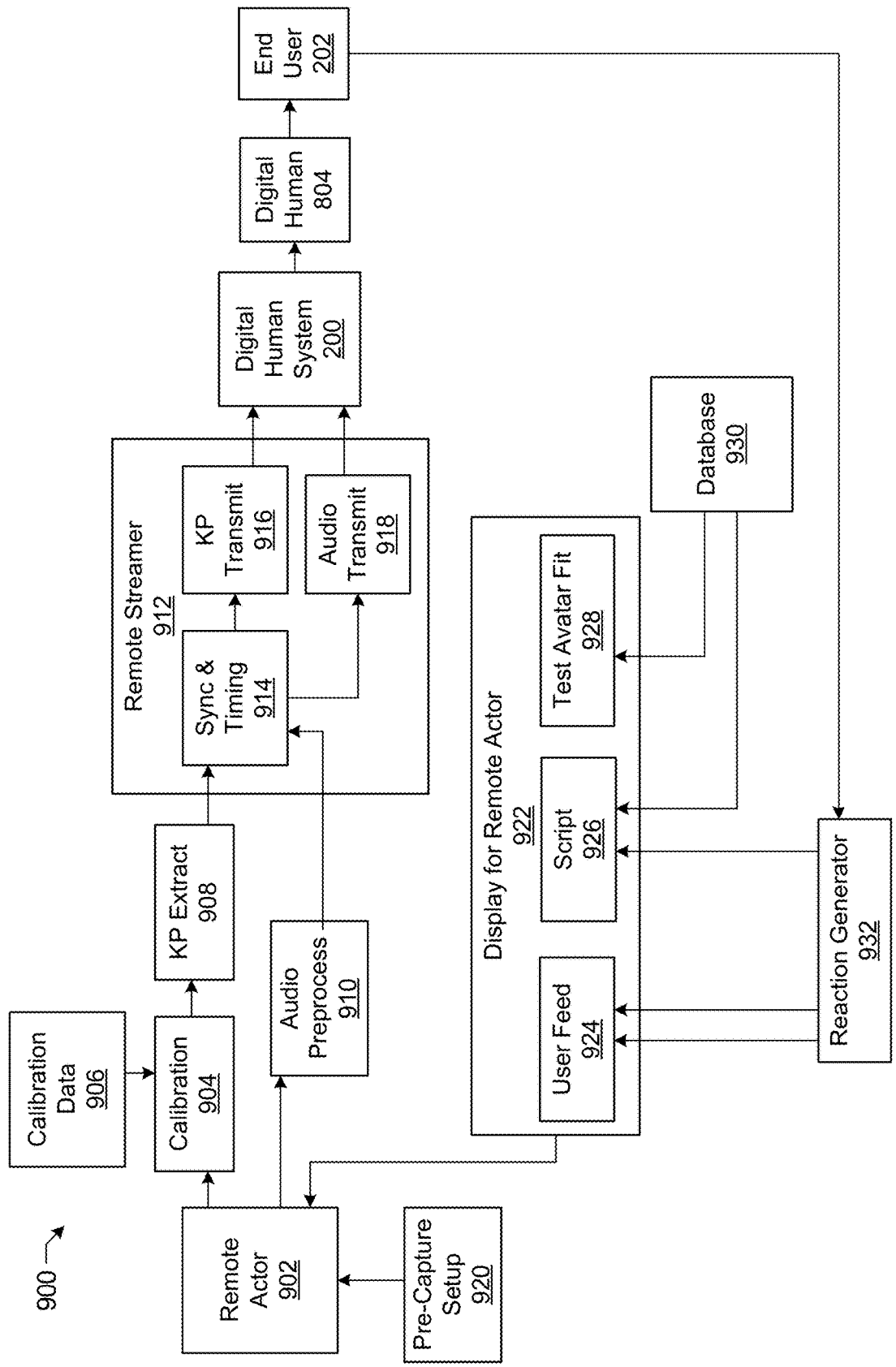
FIG. 9 illustrates another example process of generating a video of a digital avatar.

FIG. 9 illustrates another example process of generating a video of a digital avatar. In particular embodiments, a remote actor 902 may be allowed to generate, control, and drive digital humans/avatars generated by the system disclosed herein. A pre-capture setup 920 may send data to the remote actor 902. In particular embodiments, the remote actor 902 may provide video data and audio data. The video data may be fed into the calibration module 904, which is calibrated using the calibration data 906. The output of the calibration module 904 is sent to the KP extract 908, which extracts the keypoints of the video input and sends the data to the sync and timing module 914 of the remote streamer 912. The audio data may be sent to an audio preprocessing module 910 to process and send to the sync and timing module 914. The sync and timing module 914 may sync the keypoints data and the audio data received and send the output to a respective KP transmit 916 and an audio transmit 918. The KP transmit 916 and the audio transmit 918 may send outputs to the digital human system 200 to process the keypoints data and the audio data to identify a corresponding semantic context associated with the input. A K-NN graph may be used to process the input and generate a video of a digital human 804, which is then presented to the end user 202. In particular embodiments, the end user 202 may provide a reaction to a reaction generator 932. The reaction generator may send data to a user feed 924 and a script 926 of a display for the remote actor 922. The display for remote actor 922 may also include a test avatar fit 928. A database 930 may send data to the script 926 and test avatar fit 928. The display for remote actor 922 may send data back to the remote actor 902.

Figure 10:
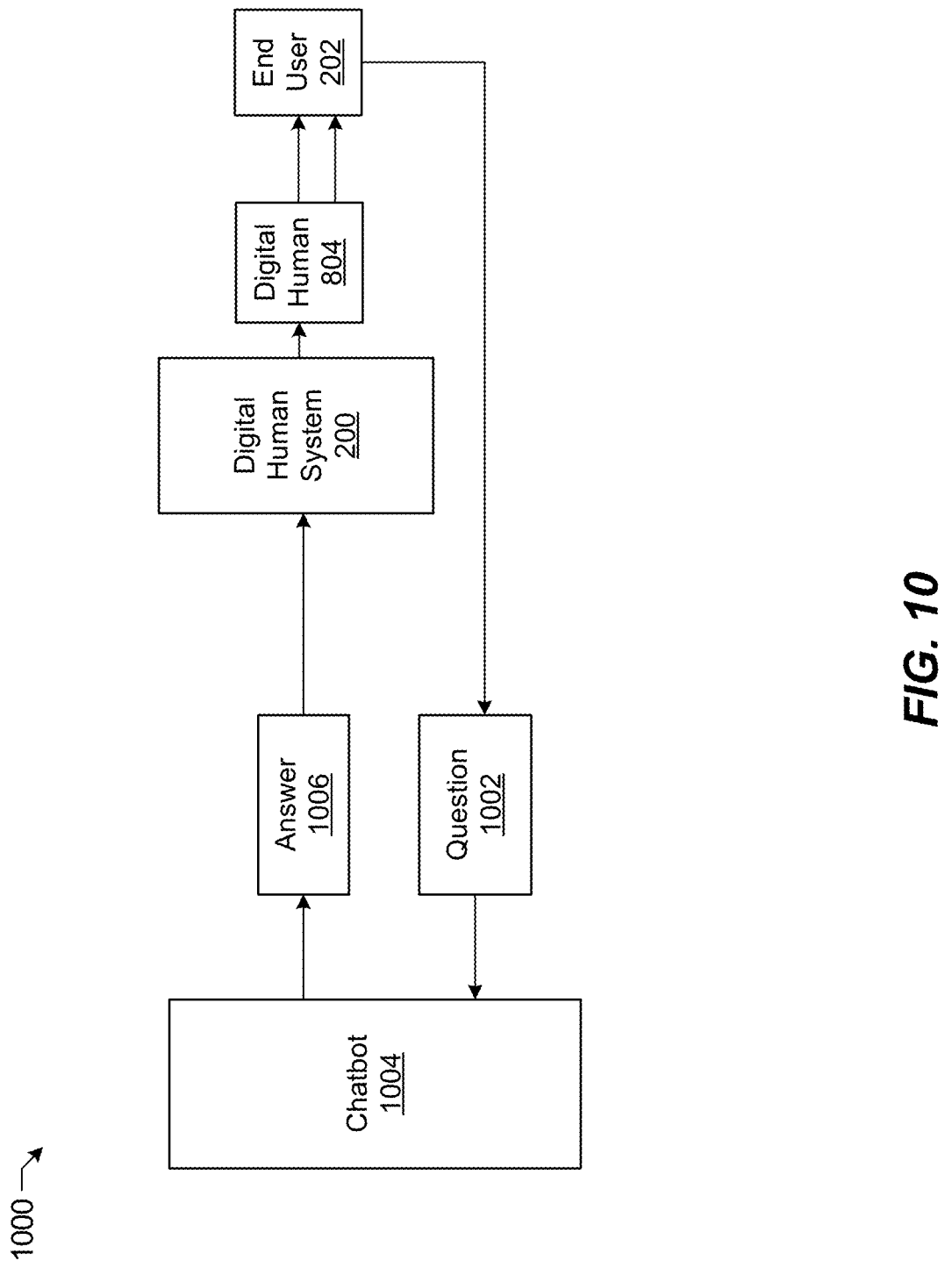
FIG. 10 illustrates another example process of generating a video of a digital avatar.

FIG. 10 illustrates another example process 1000 of generating a video of a digital avatar. In particular embodiments, the process 1000 may begin with a user 202 sending a question 1002 to a chatbot 1004. In particular embodiments, the question 1002 may be a text query. The chatbot may process the question 1002 and generate an answer 1006. The answer 1006 may be sent to the digital human system 200 to generate a video output of a digital human 804 as disclosed herein. The answer 1006 may be a text output and/or audio output. The text output and/or audio output of the answer 1006 may be processed with a graph of the digital human system 200 to identify a semantic context and associated actions to be performed by a digital human/avatar. The graph may be used to identify one or more nodes that correspond to the answer 1006. The video output of the digital human 804 may be sent to the end user 202 through both a visual and audio feed.

Figure 11:
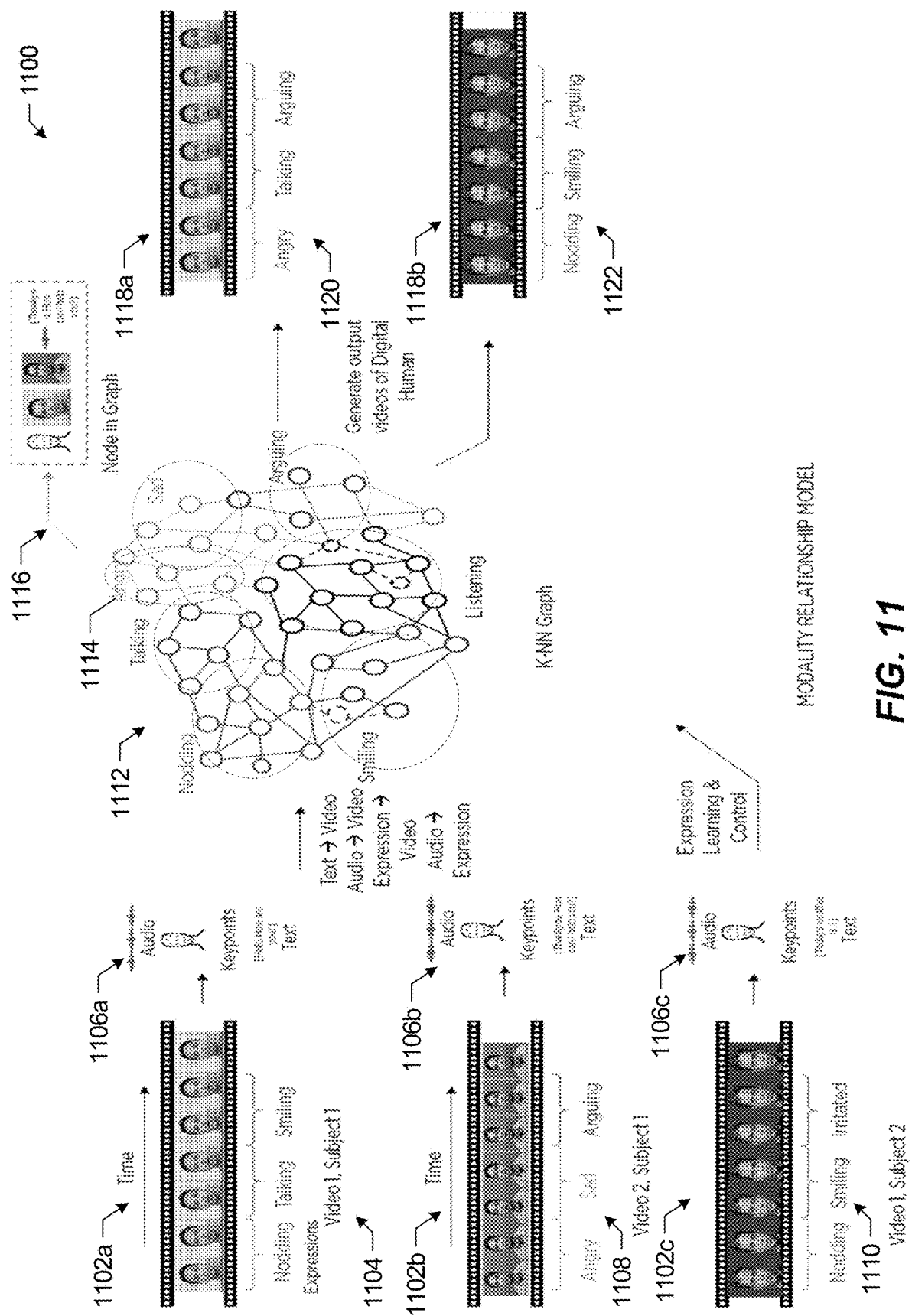
FIG. 11 illustrates an example diagram flow of generating a video of a digital avatar.

FIG. 11 illustrates an example diagram flow 1100 of generating a video of a digital avatar. In particular embodiments, video inputs 1102a-c may be received. The video input 1102a may include a plurality of semantic contexts 1104 and an audio input 1106a. As an example and not by way of limitation, the video input 1102a may include a nodding semantic context 1104a, a talking semantic context 1104b, and a smiling semantic context 1104c. The video input 1102b may include a plurality of semantic contexts 1108 and an audio input 1106b. As an example and not by way of limitation, the video input 1102b may include an angry semantic context 1108a, a sad semantic context 1108b, and an arguing semantic context 1108c. The video input 1102c may include a plurality of semantic contexts 1110 and an audio input 1106c. As an example and not by way of limitation, the video input 1102c may include a nodding semantic context 1110a, a smiling semantic context 1110b, and an irritated semantic context 1110c. In particular embodiments, keypoints may be extracted from the video inputs 1102 as disclosed herein. The audio inputs 1106 and corresponding keypoints of the inputs may be processed with the K-NN graph. The K-NN graph comprises a plurality of sets 1114 of nodes 1116. In particular embodiments, each set 1114 of nodes 1116 may correspond to a semantic context. As an example and not by way of limitation, each set 1114 may be shown by the dotted circles/ovals. In particular embodiments, each node 1116 may correspond to a particular semantic context and include one or more expressions, behaviors, actions associated with the node 1116. The expressions, behaviors, and actions associated with each node 1116 may be used to generate an output video 1118 of a digital human/avatar. In particular embodiments, the output video 1118a may comprise a plurality of semantic contexts 1120. As an example and not by way of limitation, the output video 1118a may comprise an angry semantic context 1120a, a talking semantic context 1120b, and an arguing semantic context 1120c. In particular embodiments, the output video 1118b may comprise a plurality of semantic contexts 1122. As an example and not by way of limitation, the output video 1118b may comprise a nodding semantic context 1122*a*, a smiling semantic context 1122*b*, and an arguing semantic context 1122*c*. Each of the semantic contexts 1120, 1122 may be associated with one or more actions to be performed by the digital human/avatar. As an example and not by way of limitation, a nodding semantic context may be associated with a nodding action to be performed by the digital human/avatar. While a particular number of semantic contexts, sets 1114 of nodes 1116, and/or nodes 1116 is shown, the K-NN graph may comprise any number of semantic contexts, sets 1114 of nodes 1116, and/or nodes 1116.

Figure 12:
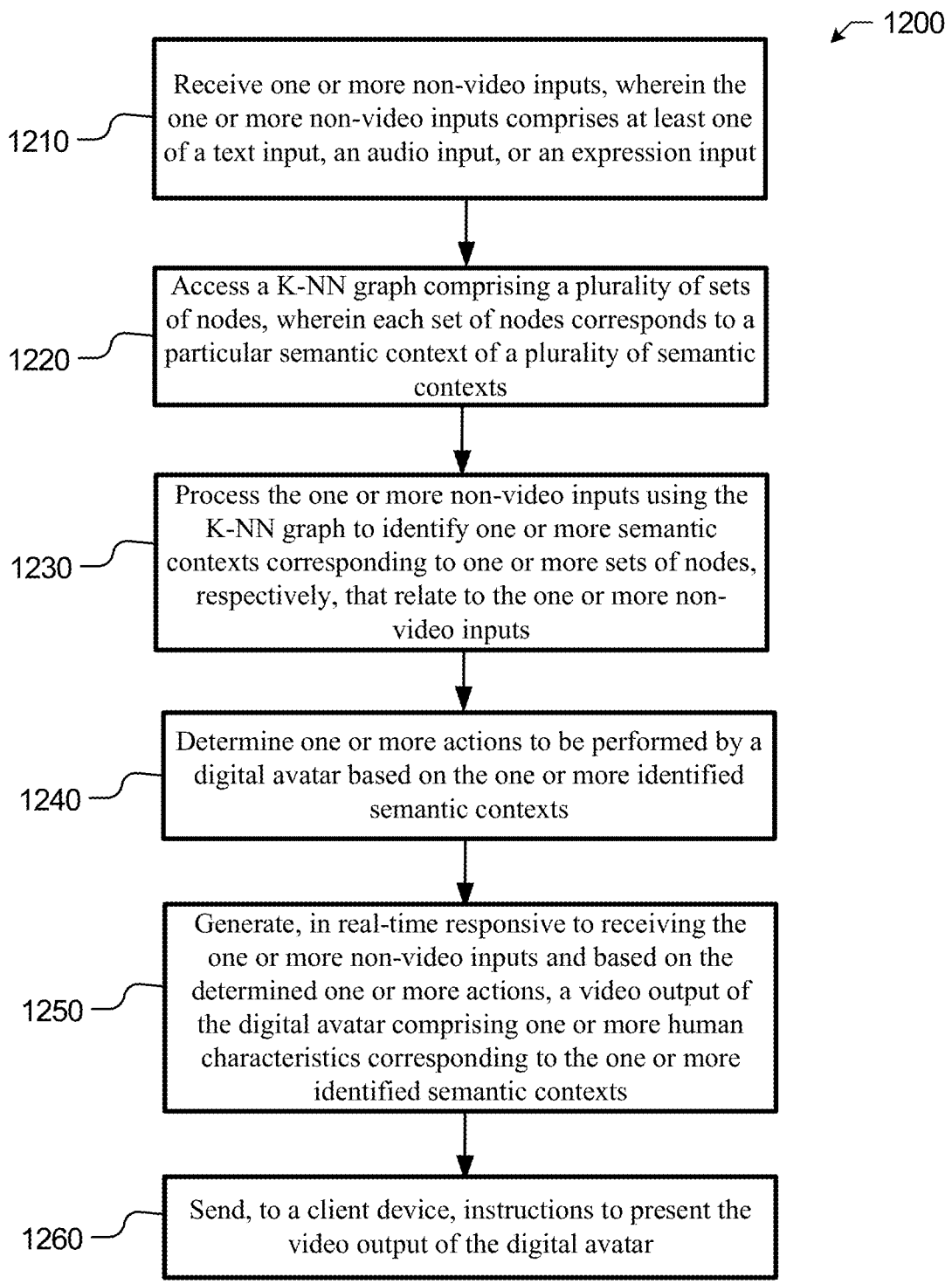
FIG. 12 illustrates an example method for generating a digital avatar.

FIG. 12 illustrates is a flow diagram of a method for generating a digital avatar, in accordance with the presently disclosed embodiments. The method 1200 may be performed utilizing one or more processing devices (e.g., one or more computing systems) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof. The one or more computing systems may use one or more systems described herein to perform one or more functions as described herein.

The method 1200 may begin at step 1210 with the one or more processing devices (e.g., one or more computing systems) receiving one or more non-video inputs. For example, in particular embodiments, the one or more non-video inputs may comprise at least one of a text input, an audio input, or an expression input. The method 1200 may then continue at step 1220 with the one or more processing devices (e.g., one or more computing systems) accessing a K-NN graph comprising a plurality of sets of nodes. In particular embodiments, each set of nodes may correspond to a particular semantic context of a plurality of semantic contexts. The method 1200 may then continue at step 1230 with the one or more processing devices (e.g., one or more computing systems) processing the one or more non-video inputs using the K-NN graph to identify one or more semantic contexts corresponding to one or more sets of nodes, respectively, that relate to the one or more non-video inputs. The method 1200 may then continue at block 1240 with the one or more processing devices (e.g., one or more computing systems) determining one or more actions to be performed by a digital avatar based on the one or more identified semantic contexts. The method 1200 may then continue at step 1250 with the one or more processing devices (e.g., one or more computing systems) generating, in real-time responsive to receiving the one or more non-video inputs and based on the determined one or more actions, a video output of the digital avatar comprising one or more human characteristics corresponding to the one or more identified semantic contexts. The method 1200 may then continue at step 1260 with the one or more processing devices (e.g., one or more computing systems) sending, to a client device, instructions to present the video output of the digital avatar. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for generating a digital avatar including the particular steps of the method of FIG. 12, this disclosure contemplates any suitable method for generating a digital avatar including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
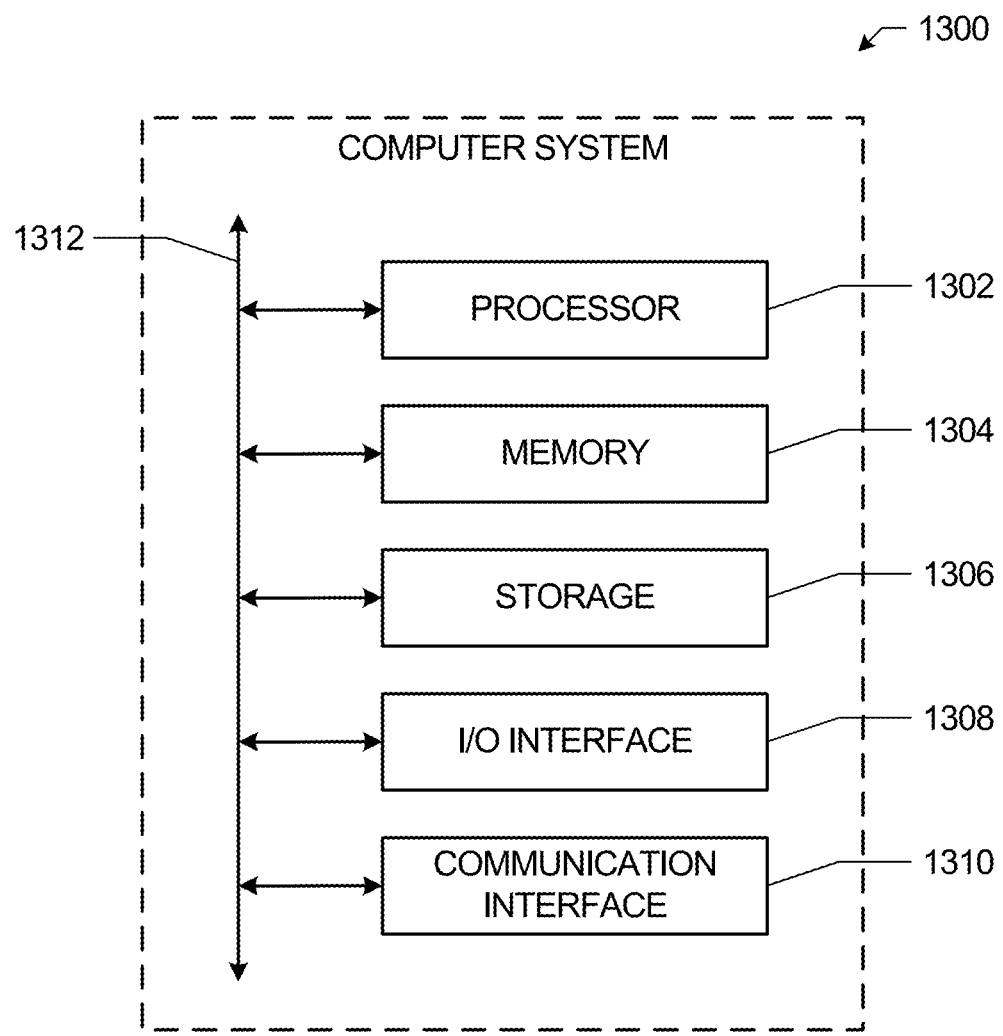
FIG. 13 illustrates an example computer system.

FIG. 13 illustrates an example computer system 1300 that may be utilized to perform generation of a digital avatar, in accordance with the presently disclosed embodiments. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks.

Where appropriate, one or more computer systems 1300 may perform without substantial spatial or temporal limitation one or more steps of one or more methods described or illustrated herein. As an example, and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement. In particular embodiments, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example, and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302.

Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example, and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere).

One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memory devices 1304, where appropriate. Although this disclosure describes and illustrates particular memory, this disclosure contemplates any suitable memory.

In particular embodiments, storage 1306 includes mass storage for data or instructions. As an example, and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1306 for them. Where appropriate, I/O interface 1308 may include one or more device or software drivers enabling processor 1302 to drive one or more of these I/O devices. I/O interface 1308 may include one or more I/O interfaces 1306, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it.

As an example, and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example, and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

AI Architecture

Figure 14:
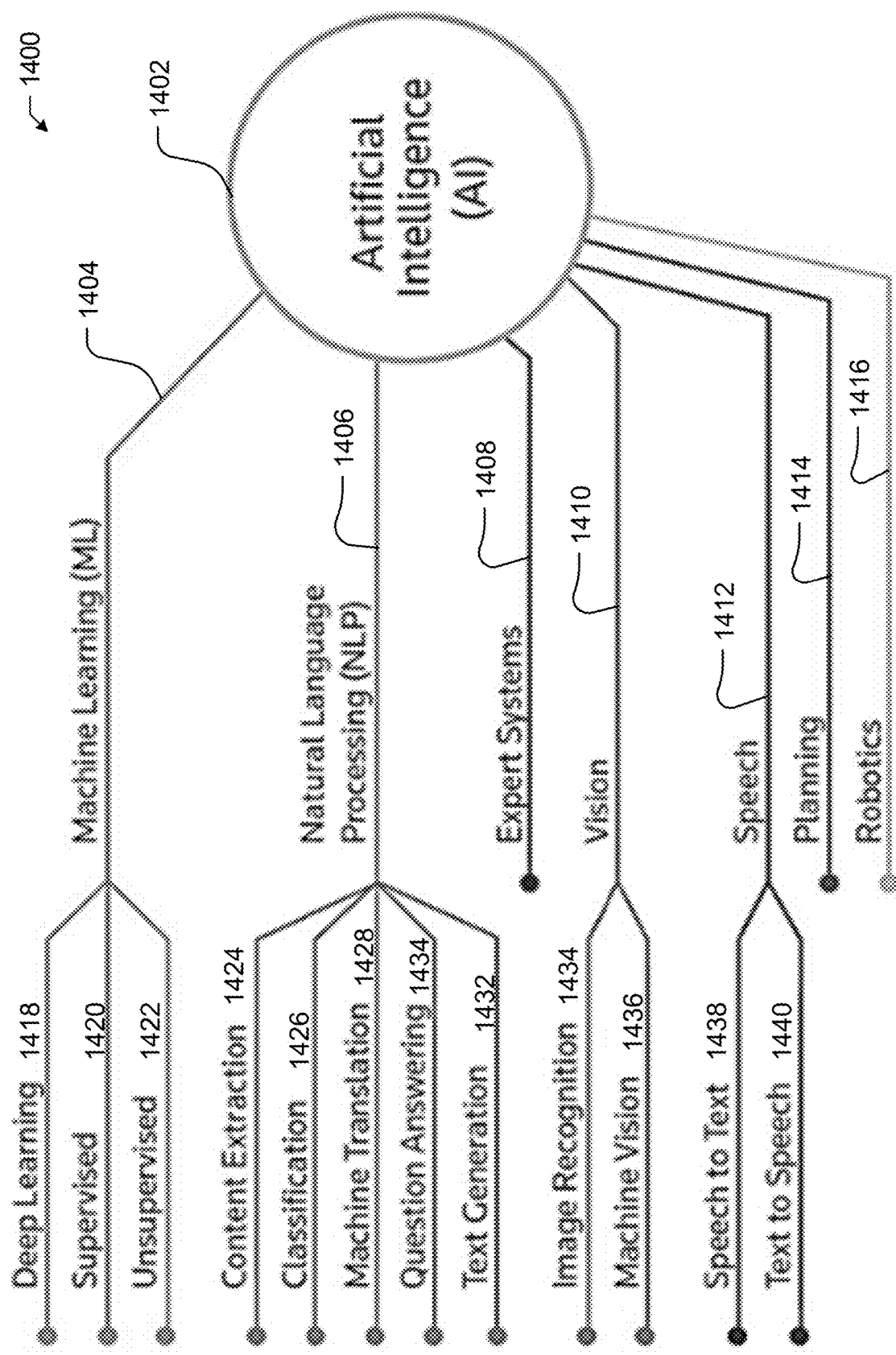
FIG. 14 illustrates a diagram of an example artificial intelligence (AI) architecture.

FIG. 14 illustrates a diagram 1400 of an example artificial intelligence (AI) architecture 1402 that may be utilized to perform generation of a digital human, in accordance with the presently disclosed embodiments. In particular embodiments, the AI architecture 1402 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 14, the AI architecture 1402 may include machine leaning (ML) algorithms and functions 1404, natural language processing (NLP) algorithms and functions 1406, expert systems 1408, computer-based vision algorithms and functions 1410, speech recognition algorithms and functions 1412, planning algorithms and functions 1414, and robotics algorithms and functions 1416. In particular embodiments, the ML algorithms and functions 1404 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1404 may include deep learning algorithms 1418, supervised learning algorithms 1420, and unsupervised learning algorithms 1422.

In particular embodiments, the deep learning algorithms 1418 may include any artificial neural networks (ANNs) that may be utilized to learn deep levels of representations and abstractions from large amounts of data. For example, the deep learning algorithms 1418 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1420 may include any algorithms that may be utilized to apply, for example, what has been learned in the past to new data using labeled examples for predicting future events. For example, starting from the analysis of a known training dataset, the supervised learning algorithms 1420 may produce an inferred function to make predictions about the output values. The supervised learning algorithms 1420 can also compare its output with the correct and intended output and find errors in order to modify the supervised learning algorithms 1420 accordingly. On the other hand, the unsupervised learning algorithms 1422 may include any algorithms that may applied, for example, when the data used to train the unsupervised learning algorithms 1422 are neither classified or labeled. For example, the unsupervised learning algorithms 1422 may study and analyze how systems may infer a function to describe a hidden structure from unlabeled data.

In particular embodiments, the NLP algorithms and functions 1406 may include any algorithms or functions that may be suitable for automatically manipulating natural language, such as speech and/or text. For example, in particular embodiments, the NLP algorithms and functions 1406 may include content extraction algorithms or functions 1424, classification algorithms or functions 1426, machine translation algorithms or functions 1428, question answering (QA) algorithms or functions 1430, and text generation algorithms or functions 1432. In particular embodiments, the content extraction algorithms or functions 1424 may include a means for extracting text or images from electronic documents (e.g., webpages, text editor documents, and so forth) to be utilized, for example, in other applications.

In particular embodiments, the classification algorithms or functions 1426 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1428 may include any algorithms or functions that may be suitable for automatically converting source text in one language, for example, into text in another language. The QA algorithms or functions

1430 may include any algorithms or functions that may be suitable for automatically answering questions posed by humans in, for example, a natural language, such as that performed by voice-controlled personal assistant devices. The text generation algorithms or functions 1432 may include any algorithms or functions that may be suitable for automatically generating natural language texts.

In particular embodiments, the expert systems 1408 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1410 may include any algorithms or functions that may be suitable for automatically extracting information from images (e.g., photo images, video images). For example, the computer-based vision algorithms and functions 1410 may include image recognition algorithms 1434 and machine vision algorithms 1436. The image recognition algorithms 1434 may include any algorithms that may be suitable for automatically identifying and/or classifying objects, places, people, and so forth that may be included in, for example, one or more image frames or other displayed data. The machine vision algorithms 1436 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1412 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1438 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1440 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by one or more computing systems, comprising:
   receiving one or more non-video inputs, wherein the one or more non-video inputs comprises at least one of a text input or an audio input;

accessing a K-NN graph comprising a plurality of sets of nodes, wherein each set of nodes corresponds to a particular semantic context of a plurality of semantic contexts;
processing the one or more non-video inputs using the K-NN graph to identify one or more non-verbal semantic contexts corresponding to one or more sets of nodes, respectively, that characterize to the one or more non-video inputs;
determining one or more actions to be performed by a digital avatar based on the one or more identified non-verbal semantic contexts;
generating, in real-time responsive to receiving the one or more non-video inputs and based on the determined one or more actions, a video output of the digital avatar comprising one or more non-verbal human characteristics corresponding to the one or more identified non-verbal semantic contexts that characterize the one or more non-video inputs; and
sending, to a client device, instructions to present the video output of the digital avatar.

2. The method of claim 1, wherein each of the plurality of semantic contexts are indicative of an expression, and wherein each node of a set of nodes that correspond to the respective semantic context is associated with an intensity of the expression.

3. The method of claim 1, wherein the K-NN graph is generated based on identified relationships between different modalities of previous inputs and the corresponding outputs, and wherein the relationships are mapped to the K-NN graph.

4. The method of claim 1, wherein the K-NN graph is generated using one or more machine-learning models that identify relationships between two or more modalities.

5. The method of claim 1, wherein processing the one or more non-video inputs further comprises:
identifying one or more nodes of a plurality of nodes of the K-NN graph, each of the one or more nodes associated with the one or more sets of nodes, that correspond to the one or more non-video inputs.

6. The method of claim 5, wherein determining the one or more actions to be performed further comprises:
determining the one or more actions that correspond to the identified one or more nodes of the plurality of nodes of the K-NN graph.

7. The method of claim 1, wherein the video output comprises a rendering of a sequence of actions performed by the digital avatar based on the determined one or more actions.

8. An apparatus comprising:
one or more non-transitory computer-readable storage media including instructions; and
one or more processors coupled to the storage media, the one or more processors configured to execute the instructions to:
receive one or more non-video inputs, wherein the one or more non-video inputs comprises at least one of a text input, an audio input or an audio input;
access a K-NN graph comprising a plurality of sets of nodes, wherein each set of nodes corresponds to a particular semantic context of a plurality of semantic contexts;
process the one or more non-video inputs using the K-NN graph to identify one or more non-verbal semantic contexts corresponding to one or more sets of nodes, respectively, that characterize to the one or more non-video inputs;
determine one or more actions to be performed by a digital avatar based on the one or more identified non-verbal semantic contexts;
generate, in real-time responsive to receiving the one or more non-video inputs and based on the determined one or more actions, a video output of the digital avatar comprising one or more non-verbal human characteristics corresponding to the one or more identified non-verbal semantic contexts that characterize the one or more non-video inputs; and
send, to a client device, instructions to present the video output of the digital avatar.

9. The apparatus of claim 8, wherein each of the plurality of semantic contexts are indicative of an expression, and wherein each node of a set of nodes that correspond to the respective semantic context is associated with an intensity of the expression.

10. The apparatus of claim 8, wherein the K-NN graph is generated based on identified relationships between different modalities of previous inputs and the corresponding outputs, and wherein the relationships are mapped to the K-NN graph.

11. The apparatus of claim 8, wherein the K-NN graph is generated using one or more machine-learning models that identify relationships between two or more modalities.

12. The apparatus of claim 8, wherein the processors are further configured to execute the instructions to:
identify one or more nodes of a plurality of nodes of the K-NN graph, each of the one or more nodes associated with the one or more sets of nodes, that correspond to the one or more non-video inputs.

13. The apparatus of claim 12, wherein the processors are further configured to execute the instructions to:
determine the one or more actions that correspond to the identified one or more nodes of the plurality of nodes of the K-NN graph.

14. The apparatus of claim 8, wherein the video output comprises a rendering of a sequence of actions performed by the digital avatar based on the determined one or more actions.

15. A computer-readable non-transitory storage media comprising instructions executable by a processor to:
receive one or more non-video inputs, wherein the one or more non-video inputs comprises at least one of a text input, an audio input or an audio input;
access a K-NN graph comprising a plurality of sets of nodes, wherein each set of nodes corresponds to a particular semantic context of a plurality of semantic contexts;
process the one or more non-video inputs using the K-NN graph to identify one or more non-verbal semantic contexts corresponding to one or more sets of nodes, respectively, that characterize to the one or more non-video inputs;
determine one or more actions to be performed by a digital avatar based on the one or more identified non-verbal semantic contexts;
generate, in real-time responsive to receiving the one or more non-video inputs and based on the determined one or more actions, a video output of the digital avatar comprising one or more non-verbal human characteristics corresponding to the one or more identified non-verbal semantic contexts that characterize the one or more non-video inputs; and
send, to a client device, instructions to present the video output of the digital avatar.

16. The media of claim 15, wherein each of the plurality of semantic contexts are indicative of an expression, and wherein each node of a set of nodes that correspond to the respective semantic context is associated with an intensity of the expression.

17. The media of claim 15, wherein the K-NN graph is generated based on identified relationships between different modalities of previous inputs and the corresponding outputs, and wherein the relationships are mapped to the K-NN graph.

18. The media of claim 15, wherein the K-NN graph is generated using one or more machine-learning models that identify relationships between two or more modalities.

19. The media of claim 15, wherein the instructions are further executable by the processor to:
    identify one or more nodes of a plurality of nodes of the K-NN graph, each of the one or more nodes associated with the one or more sets of nodes, that correspond to the one or more non-video inputs.

20. The media of claim 19, wherein the instructions are further executable by the processor to:
    determine the one or more actions that correspond to the identified one or more nodes of the plurality of nodes of the K-NN graph.

\* \* \* \* \*